US010833360B2

(12) United States Patent
Hegde et al.

(10) Patent No.: US 10,833,360 B2
(45) Date of Patent: Nov. 10, 2020

(54) PROTECTIVE ANODE COATINGS FOR HIGH ENERGY BATTERIES

(71) Applicant: Northwestern University, Evanston, IL (US)

(72) Inventors: Vinay Ishwar Hegde, Chicago, IL (US); David H. Snydacker, Evanston, IL (US); Christopher M. Wolverton, Evanston, IL (US)

(73) Assignee: Northwestern University, Evanston, IL (US)

( * ) Notice: Subject to any disclaimer, the term of this patent is extended or adjusted under 35 U.S.C. 154(b) by 164 days.

(21) Appl. No.: 16/081,533

(22) PCT Filed: Mar. 8, 2017

(86) PCT No.: PCT/US2017/021365
§ 371 (c)(1),
(2) Date: Aug. 31, 2018

(87) PCT Pub. No.: WO2017/156130
PCT Pub. Date: Sep. 14, 2017

(65) Prior Publication Data
US 2019/0088991 A1 Mar. 21, 2019

Related U.S. Application Data

(60) Provisional application No. 62/306,866, filed on Mar. 11, 2016.

(51) Int. Cl.
*H01M 10/0562* (2010.01)
*H01M 10/052* (2010.01)
(Continued)

(52) U.S. Cl.
CPC ....... *H01M 10/0562* (2013.01); *H01M 4/134* (2013.01); *H01M 4/366* (2013.01); *H01M 10/052* (2013.01); *H01M 2300/0068* (2013.01)

(58) Field of Classification Search
CPC .......... H01M 10/0562; H01M 10/052; H01M 2300/0068; H01M 4/134; H01M 4/366
See application file for complete search history.

(56) References Cited

U.S. PATENT DOCUMENTS 5,314,765 A 5/1994 Bates
7,514,180 B2 4/2009 Li
(Continued)

OTHER PUBLICATIONS

Aykol, et al., "High-throughput Computational Design of Cathode Coatings for Li-ion Batteries," Nature Communications, 2016, pp. 1-12.
(Continued)

*Primary Examiner* — Jane J Rhee
(74) *Attorney, Agent, or Firm* — Bell & Manning LLC

(57) ABSTRACT

Materials for coating a metal anode in a high energy battery, anodes coated with the materials, and batteries incorporating the coated anodes are provided. Also provided are batteries that utilize the materials as electrolytes. The coatings, which are composed of binary, ternary, and higher order metal and/or metalloid oxides, nitrides, fluorides, chlorides, bromides, sulfides, and carbides limit the reactions between the electrolyte and the metal anode in a battery, thereby improving the performance of the battery, relative to a battery that employs a bare anode.

17 Claims, 4 Drawing Sheets

(51) Int. Cl.
  *H01M 4/36* (2006.01)
  *H01M 4/134* (2010.01)

(56) References Cited

U.S. PATENT DOCUMENTS

| | | |
|---|---|---|
| 8,778,522 B2 | 7/2014 | Visco et al. |
| 2002/0012846 A1 | 1/2002 | Skotheim et al. |
| 2004/0253510 A1 | 12/2004 | Jonghe et al. |
| 2006/0194115 A1 | 8/2006 | De Jonghe et al. |
| 2012/0130691 A1 | 5/2012 | Li et al. |
| 2012/0202112 A1 | 8/2012 | Yushin et al. |
| 2014/0234536 A1 | 8/2014 | Xu et al. |
| 2015/0066413 A1 | 3/2015 | Wolverton et al. |
| 2015/0228978 A1 | 8/2015 | Gadkaree et al. |

OTHER PUBLICATIONS

Kirklin et al., " High-throughput Computational Screening of New Li-Ion Battery Anode Materials," Advanced Energy Materials, 2013, vol. 3, pp. 252-262.

Mueller et al., "Evaluation of Tavorite-Structured Cathode Materials for Lithium-Ion Batteries Using High-Throughput Computing," Chemistry of Materials, 2011, vol. 23, pp. 3854-3862.

Shi-Gang et al., "High-throughput theoretical design of lithium battery materials," Chin, Phys, B, 2016, vol. 25, No. 1, pp. 018208-1-018208-9.

Ahmed et al., Electrode surface engineering by atomic layer deposition: A promising pathway toward better energy storage, Nano Today, vol. 11, Apr. 27, 2016, pp. 250-271.

Wang et al., Conformal, Nanoscale ZnO Surface Modification of Garnet-Based Solid-State Electrolyte for Lithium Metal Anodes, Nano Lett. 2017, 17, 2016, pp. 565-571.

Snydacker et al., Electrochemically Stable Coating Materials for Li, Na, and Mg Metal Anodes in Durable High Energy Batteries, Journal of the Electrochemical Society, 164 (14), 2017, pp. A3582-A3589.

Shi et al., Enhanced electrochemical performance of LiF-modified $LiNi_{1/3}Co_{1/3}Mn_{1/3}O_2$ cathode materials for Li-ion batteries, Journal of Power Sources 225, Oct. 29, 2012, pp. 338-346.

Saal et al., Materials Design and Discovery with High-Throughput Density Functional Theory: The Open Quantum Materials Database (OQMD), JOM, vol. 65, No. 11, 2013, Sep. 28, 2013, pp. 1501-1509.

McCloskey, Bryan D., Attainable Gravimetric and Volumetric Energy Density of Li-S and Li Ion Battery Cells with Solid Separator-Protected Li Metal Anodes, J. Phys. Chem. Lett. 2015, 6, 2015, pp. 4581-4588.

Ma et al., A lithium anode protection guided highly-stable lithium-sulfur battery, Chem. Commun., 2014, 50, 2014, pp. 14209-14212.

Luntz et al., Interfacial Challenges in Solid-State Li Ion Batteries, J. Phys. Chem. Lett. 2015, 6, Nov. 9, 2015, pp. 4599-4604.

Kuwata et al., Characterization of Thin-Film Lithium Batteries with Stable Thin-Film Li3PO4 Solid Electrolytes Fabricated by ArF Excimer Laser Deposition, Journal of The Electrochemical Society, 157 (4), Mar. 11, 2010, pp. A521-A527.

Kozen et al., Next-Generation Lithium Metal Anode Engineering via Atomic Layer Deposition, ACS NANO, May 2015, pp. 10 pages.

Kazyak et al., Improved Cycle Life and Stability of Lithium Metal Anodes through Ultrathin Atomic Layer Deposition Surface Treatments, Chem. Mater., 2015, 27, 2015, pp. 6457-6462.

International Search Report and Written Opinion for PCT/US2017/021365, , dated Jun. 27, 2017, pp. 1-9.

Kirklin et al, The Open Quantum Materials Database (OQMD): assessing the accuracy of DFT formation energies, Computational Materials, vol. 1, Dec. 11, 2015, pp. 1-15.

Chen et al, The pursuit of solid-state electrolytes for lithium batteries: from comprehensive insight to emerging horizons, Mater. Horiz., 2016, 3, 487, Aug. 15, 2016, pp. 487-516.

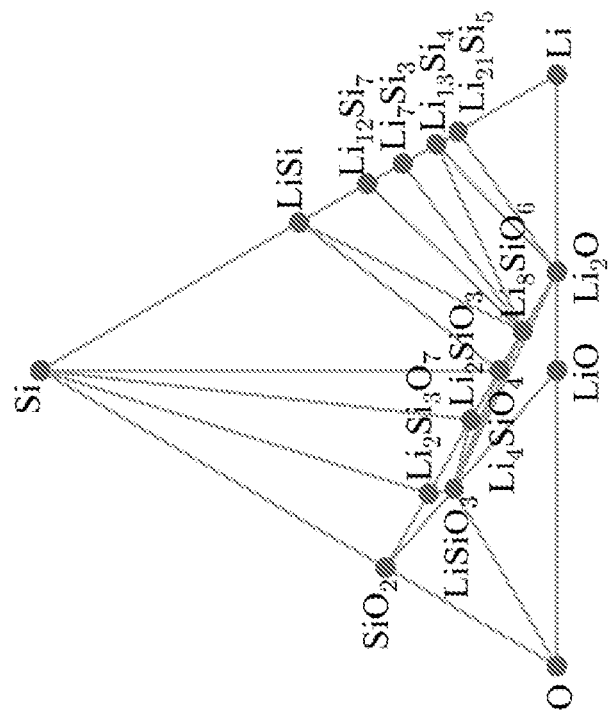
FIG. 2B: Li-Si-O
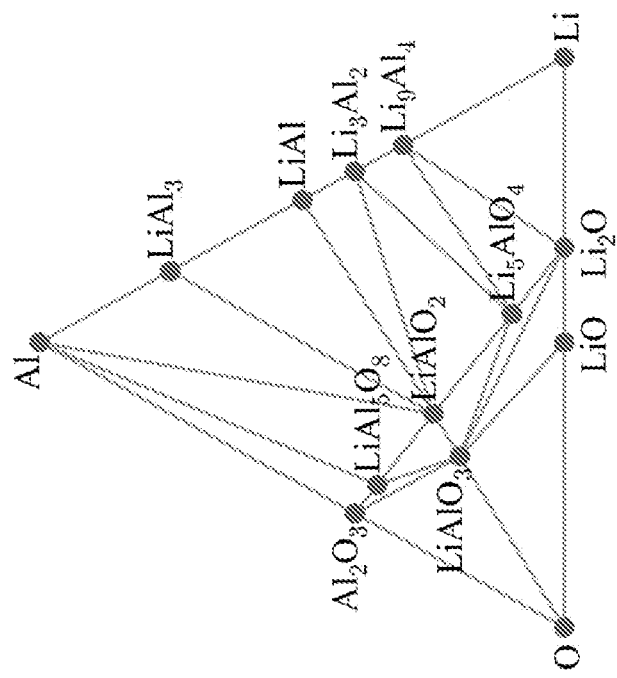
FIG. 2A: Li-Al-O

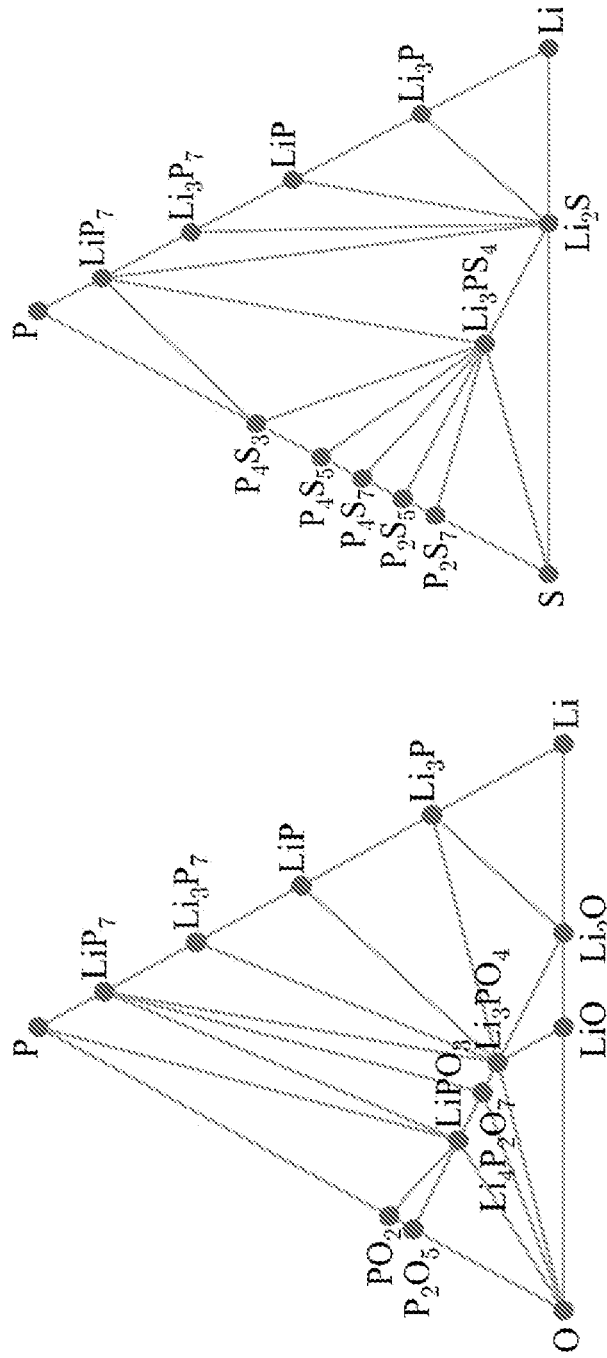
FIG. 2D: Li-P-S
FIG. 2C: Li-P-O

PROTECTIVE ANODE COATINGS FOR HIGH ENERGY BATTERIES

CROSS-REFERENCE TO RELATED APPLICATIONS

The present application is a National Stage of International Application No. PCT/US2017/021365 that was filed Mar. 8, 2017, the entire contents of which are hereby incorporated by reference; which claims priority to U.S. provisional patent application No. 62/306,866 that was filed Mar. 11, 2016, the entire contents of which are hereby incorporated by reference.

REFERENCE TO GOVERNMENT RIGHTS

This invention was made with government support under DE-AC02-06CH11357 (Subcontract 9F-31901 from Argonne National Laboratories to Northwestern University) awarded by the Department of Energy and DMR1309957 awarded by the National Science Foundation. The government has certain rights in the invention.

BACKGROUND

The energy density of batteries is a critical bottleneck limiting the performance of portable electronics and electric vehicles. Lithium batteries offer superlative energy density, and for two decades, incremental improvements in materials, chemistry, and cell engineering have increased energy density from 250 to 650 Wh/L. While there are many ongoing efforts to increase energy density, most approaches offer only incremental improvements. For example, substituting a new $Li_2MnO_3*LiMO_2$ cathode material for state-of-the-art $LiNi_{0.8}Co_{0.15}Al_{0.05}O_2$ offers only 7% improvement in cathode energy density. (See, Croy, J. R.; Abouimrane, A.; Zhang, Z. Next-Generation Lithium-Ion Batteries: the Promise of Near-Term Advancements. *MRS bulletin* 2014, 39, 407-415.) Similarly, substituting a new silicon-carbon composite anode for a conventional graphite anode offers only 20% improvement in cell energy density. (See, Obrovac, M. N.; Chevrier, V. L. Alloy Negative Electrodes for Li-Ion Batteries. *Chem. Rev.* 2014, 114, 11444-11502.)

Metal anodes, which are comprised entirely or almost entirely of the mobile element in a battery, present a rare opportunity for major improvement in energy density. For example, in a lithium battery with a $LiNi_{0.8}Co_{0.15}Al_{0.05}O_2$ cathode, energy density can be doubled by substituting a lithium metal anode in place of a conventional graphite anode. (See, McCloskey, B. D. The Attainable Gravimetric and Volumetric Energy Density of Li—S and Li-Ion Battery Cells with Solid Separator-Protected Li-Metal Anodes. *J. Phys. Chem. Lett.* 2015, 6 (22), 4581-4588.) This doubling in energy density is attainable because metal anodes can eliminate host materials, polymeric binders, electrolyte-filled pores, and even copper current collectors from the anode. (See, Hovington, P.; Lagacé, M.; Guerfi, A.; Bouchard, P.; Mauger, A.; Julien, C. M.; Armand, M.; Zaghib, K. New Lithium Metal Polymer Solid State Battery for an Ultrahigh Energy: Nano C—$LiFePO_4$ Versus Nano $Li_{1.2}V_3O_8$. *Nano Lett.* 2015, 15, 2671-2678.) Metal anodes also offer the lowest possible anode redox potential and therefore the highest possible cell voltage. In batteries where Na or Mg is the mobile element, metal anodes eliminate the need for anode host materials, which often exhibit poor capacity, kinetics, and reversibility for these elements. (See, Seh, Z. W.; Sun, J.; Sun, Y.; Cui, Y. A Highly Reversible Room-Temperature Sodium Metal Anode. *ACS Cent. Sci.* 2015, 1 (8), 449-455; Saha, P.; Datta, M. K.; Velikokhatnyi, O. I.; Manivannan, A.; Alman, D.; Kumta, P. N. Rechargeable Magnesium Battery: Current Status and Key Challenges for the Future. *Progress in Materials Science* 2014, 66, 1-86.)

A major challenge for the implementation of metal anodes is reactivity between the metals and electrolytes. Metal anodes must be electropositive to provide a sufficient cell voltage, but this electropositivity causes the metals to drive electrochemical reduction of electrolytes. Both liquid and solid electrolytes are often reactive at the anode surface. For graphite anodes in conventional lithium-ion batteries, reactivity can be mitigated by a passivation layer that forms in situ from the reaction products. This passivation layer must be mechanically durable, electronically insulating to block electron transfer from the anode to the electrolyte, and chemically stable or metastable. For metal anodes, there is sparse evidence for passivation by in situ reactivity. Reactivity at the surface of metal anodes causes impedance growth that destroys cell performance, according to Luntz et al. (See, Luntz, A. C.; Voss, J.; Reuter, K. Interfacial Challenges in Solid-State Li Ion Batteries. *J. Phys. Chem. Lett.* 2015, 6, 4599-4604.) These authors argue that "the principal hurdle for developing successful solid-state batteries for EVs is in minimizing the interfacial impedances between the [solid electrolyte] and the electrodes and not in maximizing the conductivity in the [solid electrolytes]."

To limit reactivity between metal anodes and electrolytes, coating materials can be deposited on the metal surface prior to cell assembly. These coatings typically range between one nanometer and one micrometer in thickness. Similar to passivation layers, these coatings should be durable and electronically insulating to block transfer of electrons. Unlike passivation layers, these coatings can be deposited at elevated temperatures from a variety of precursors, allowing for greater control of coating characteristics. Anode coatings function as an additional electrolyte layer and can be used in conjunction with other liquid or solid electrolytes. Li metal anodes have been protected with a variety of coatings including $Li_3N$, $Li_3PO_4$, and $Al_2O_3$. (See, Ma, G.; Wen, Z.; Wu, M.; Shen, C.; Wang, Q.; Jin, J.; Wu, X. Lithium Anode Protection Guided Highly-Stable Lithium-Sulfur Battery. *Chem. Commun.* 2014, 50, 14209-14212; Kuwata, N.; Iwagami, N.; Tanji, Y.; Matsuda, Y. Characterization of Thin-Film Lithium Batteries with Stable Thin-Film $Li_3PO_4$ Solid Electrolytes Fabricated by ArF Excimer Laser Deposition. *J. Electrochem. Soc.* 2010, 157 (4), A521-A527; Kozen, A. C.; Lin, C.-F.; Pearse, A. J.; Schroeder, M. A.; Han, X.; Hu, L.; Lee, S.-B.; Rubloff, G. W.; Noked, M. Next-Generation Lithium Metal Anode Engineering via Atomic Layer Deposition. *ACS nano* 2015, 9 (6), 5884-5892; Kazyak, E.; Wood, K. N.; Dasgupta, N. P. Improved Cycle Life and Stability of Lithium Metal Anodes Through Ultrathin Atomic Layer Deposition Surface Treatments. *Chem. Mater.* 2015, 27, 6457-6462.) Anode coatings, like electrolytes, can also react with the anode metal. Thus, durable batteries with metal anodes require selection of anode coatings that are stable in contact with the anode metal.

SUMMARY

One aspect of the invention provides coated lithium metal anodes for high energy batteries. Also provided are batteries incorporating the coated lithium metal anodes.

One embodiment of a coated lithium metal anode includes: a lithium metal anode; and a coating on at least a portion of the lithium metal anode, wherein the coating comprises a metal sulfide selected from SrS, CaS, YbS, and combinations thereof. One embodiment of a lithium battery incorporating the coated lithium metal anode includes: the coated lithium metal anode; a cathode in electrical communication with the coated lithium metal anode; and an electrolyte disposed between the coated lithium metal anode and the cathode. The electrolyte can be, for example, a sulfide solid electrolyte.

Another embodiment of a coated lithium metal anode includes: a lithium metal anode; and a coating on at least a portion of the lithium metal anode, wherein the coating comprises a metal oxide selected from rare earth metal oxides, ternary lithium oxides other than $Li_3PO_4$, quaternary lithium oxides, calcium oxide, or a combination thereof, and further wherein the metal oxide is stable; exhibits chemical equilibrium with the lithium metal anode; and is electrically insulating. One embodiment of a lithium battery incorporating these coated lithium metal anodes includes: the coated lithium metal anode; a cathode in electrical communication with the coated lithium metal anode; and an electrolyte disposed between the coated lithium metal anode and the cathode. The coating can be composed of, for example, $Li_2HfO_3$ and/or $Li_7La_3Hf_2O_{12}$. The electrolyte can include, for example, a lithium salt in an organic solvent, such as a carbonate, an ether, or an acetal, or can be a solid electrolyte, such as a solid polymer electrolyte, an oxide solid electrolyte, a phosphate solid electrolyte, or a nitride solid electrolyte. Although, other electrolytes could be used. In one variation of this embodiment, the coating is composed of $Li_7La_3Hf_2O_{12}$ and the electrolyte is a $Li_7La_3Zr_2O_{12}$ oxide solid electrolyte. In some such variations, the anode coating material is a garnet-structured gradient material having the composition $Li_7La_3Zr_2O_{12}$ at the solid electrolyte interface and the composition $Li_7La_3Hf_2O_{12}$ at the lithium metal anode surface. The metal oxide coating can also be composed of, for example, a rare earth metal oxide having the formula $R_2O_3$, where R is selected from Dy, Er, Gd, Ho, La, Lu, Nd, Pr, Sm, Tm, and Y; or a rare earth metal oxide having the formula $LiRO_2$, where R is selected from Dy, Er, Gd, Ho, Sc, and Tb. The electrolyte can include, for example, a lithium salt in an organic solvent, such as a carbonate, an ether, or an acetal, or can be a solid electrolyte, such as a solid polymer electrolyte, an oxide solid electrolyte, a phosphate solid electrolyte, or a nitride solid electrolyte. Although other electrolytes could be used.

Another embodiment of a coated lithium metal anode includes: a lithium metal anode; and a coating on at least a portion of the lithium metal anode, wherein the coating comprises a metal halide selected from metal fluorides other than LiF, metal chlorides, and metal bromides, and the metal of the metal halide comprises an alkali metal, an alkaline earth metal, or a rare earth metal, and further wherein metal halide is stable; exhibits chemical equilibrium with the lithium metal anode; and is electrically insulating. One embodiment of a lithium battery incorporating these coated lithium metal anodes includes: the coated lithium metal anode; a cathode in electrical communication with the coated lithium metal anode; and an electrolyte disposed between the coated lithium metal anode and the cathode. The coating can be composed of, for example, a metal halide selected from $CaF_2$, $SrF_2$, $YbF_2$, $EuF_2$, or a combination thereof; $YbCl_2$; $YbBr_2$, $BaBr_2$, $SrBr_2$, $EuBr_2$, or a combination thereof; and/or LiCl, NaCl, KCl, RbCl, CsCl, or a combination thereof. The electrolyte can include, for example, a lithium salt in an organic solvent, such as a carbonate, an ether, or an acetal, or can be a solid electrolyte, such as a solid polymer electrolyte, an oxide solid electrolyte, a phosphate solid electrolyte, or a nitride solid electrolyte. Although, other electrolytes could be used. In some variations of these batteries, the electrolyte is a sulfide solid electrolyte.

Another embodiment of a coated lithium metal anode includes: a lithium metal anode; and a coating on at least a portion of the lithium metal anode, wherein the coating comprises a ternary lithium nitride, wherein the ternary lithium nitride is stable; exhibits chemical equilibrium with the lithium metal anode; and is electrically insulating. One embodiment of a lithium battery incorporating these coated lithium metal anodes includes: the coated lithium metal anode; a cathode in electrical communication with the coated lithium metal anode; and an electrolyte disposed between the coated lithium metal anode and the cathode. The coating can be composed of, for example, a ternary lithium nitride having the formula $Li_xMN_4$, wherein x is 5, 6, or 7 and M is an element selected from Ta, Nb, W, V, Re, and Mo; a ternary lithium nitride having the formula $Li_xMN_2$, wherein x is 2 or 3 and further wherein, when x is 2, M is selected from Zr, C, and Si, and when x is 3, M is Sc or B; and/or a ternary lithium nitride selected from $LiMgN$, $Li_5Br_2N$, $Li_{10}BrN_3$, $Li_4SrN_2$, $Li_8TeN_2$, or a combination thereof. The electrolyte can include, for example, a lithium salt in an organic solvent, such as a carbonate, an ether, or an acetal, or can be a solid electrolyte, such as a solid polymer electrolyte, an oxide solid electrolyte, a phosphate solid electrolyte, or a nitride solid electrolyte. Although, other electrolytes could be used.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

FIG. 1A illustrates stability for a candidate compound with respect to the set of nearest-energy competing phases. The competing phases are determined by removing the candidate compound and calculating a hypothetical convex hull, which is represented by the red dashed line. FIG. 1B illustrates equilibrium of a compound with Li metal, which requires a tie line between the compound and Li metal.

FIG. 2A shows the phase diagram for the Li—Al—O ternary system calculated at 400 K using compounds from the OQMD. FIG. 2B shows the phase diagram for the Li—Si—O ternary system calculated at 400 K using compounds from the OQMD. FIG. 2C shows the phase diagram for the Li—P—O ternary system calculated at 400 K using compounds from the OQMD. FIG. 2D shows the phase diagram for the Li—P—S ternary system calculated at 400 K using compounds from the OQMD. In these systems, no ternary phases exhibit tie lines with lithium metal. When a ternary Li-M-X (X=O, S) phase is combined with an excess of lithium metal, these phase diagrams show that the phase will react to form $Li_2X$ and a metallic Li-M phase. These metallic phases allow continued electron transport from the lithium anode to the electrolyte and therefore continued reactivity.

DETAILED DESCRIPTION

Figure 1A:
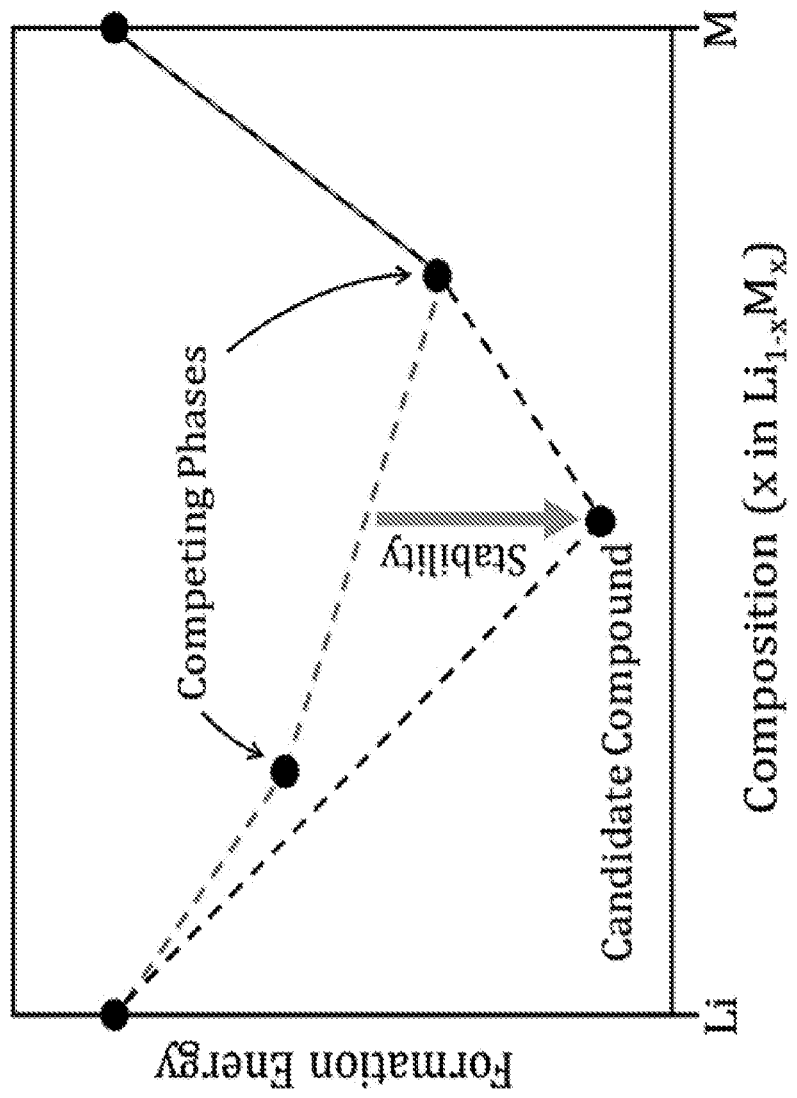
FIGS. 1A and 1B depict thermodynamic concepts used for screening compounds. The stable convex hull is shown with a black dashed line.

Materials for coating the metal anode in a high energy battery, anodes coated with the materials, and batteries incorporating the coated anodes are provided. Also provided are batteries that utilize the materials as electrolytes.

The coatings, which are composed of binary, ternary, and higher order metal and/or metalloid oxides, nitrides, fluorides, chlorides, bromides, sulfides, and carbides can reduce the reactions between the electrolyte and active material of a metal anode, such as a lithium anode, a sodium anode, or a magnesium anode, in a metal battery, thereby improving the performance of the battery, relative to a battery that employs a bare anode.

A basic embodiment of a battery includes: a cathode; an anode in electrical communication with the cathode; and an electrolyte disposed between the anode and the cathode. If the electrolyte is not a solid electrolyte, the battery will typically also include a separator disposed between the anode and the cathode. The batteries include lithium metal batteries, sodium metal batteries, and magnesium metal batteries.

The electrolytes are ionically conductive materials and may include solvents, ionic liquids, metal salts, ions such as metal ions or inorganic ions, polymers, ceramics, and other components. An electrolyte may be an organic or inorganic solid or a liquid, such as a solvent (e.g., a non-aqueous solvent) containing dissolved salts.

Example salts that may be included in electrolytes for lithium metal batteries include lithium salts, such as $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y-1}SO_2)$, (where $\chi$ and y are natural numbers), $LiCl$, $LiI$, $LiNO_3$, and mixtures thereof. Non-aqueous electrolytes can include organic solvents, such as, cyclic carbonates, linear carbonates, fluorinated carbonates, benzonitrile, acetonitrile, tetrahydrofuran, 2-methyltetrahydrofuran, γ-butyrolactone, dioxolane, 4 methyldioxolane, N,N-dimethylformamide, N,N-dimethylacetamide, N,N-dimethylsulfoxide, dioxane, 1,2-dimethoxyethane, sulfolane, dichloroethane, chlorobenzene, nitrobenzene, diethyleneglycol, dimethylether, and mixtures thereof.

Examples of solid-state electrolytes for lithium metal batteries include sulfide solid electrolytes, such as $Li_3PS_4$, $Li_{10}GeP_2S_{12}$, $Li_6PS_5Br$, $Li_7P_2S_8I$, $Li_3PS_4$, $Li_{10}SiP_2S_{12}$, $Li_{10}SnP_2S_{12}$, $Li_6PS_5Cl$, $Li_{3.25}Ge_{0.25}P_{0.75}S_4$, and $Li_{3.4}Si_{0.4}P_{0.6}S_4$; oxide solid electrolytes, such as $Li_7La_3Zr_2O_{12}$, $LiLaTi_2O_6$, $Li_3PO_4$, $LiTi_2P_3O_{12}$, $Li_{1.3}Al_{0.3}Ti_{1.7}(PO_4)_3$, $Li_{0.34}La_{0.51}TiO_{2.94}$, and $Li_{6.55}La_3Zr_2Ga_{0.15}O_{12}$; and nitride solid electrolytes, such as $Li_7PN_4$. Further examples of sulfide solid-state electrolytes for lithium metal batteries include mixtures of $xLi_2S \cdot (1-x)P_2S_5$ where x ranges from about 0.7 to about 0.8. Solid polymer electrolytes (SPEs) can also be used.

Examples of electrolytes for sodium metal batteries include $NaPF_6$ (sodium hexafluorophosphate) in glymes (e.g., mono-, di-, and tetraglyme), sodium hexafluorophosphate in glymes, and chloroaluminate ionic liquid electrolytes. Magnesium(II) bis(trifluoromethane sulfonyl) amide in triglyme is an example of an electrolyte for a magnesium metal battery.

The separators are typically thin, porous or semi-permeable, insulating films with high ion permeabilities. The separators can be composed of polymers, such as olefin-based polymers (e.g., polyethylene, polypropylene, and/or polyvinylidene fluoride). If a solid-state electrolyte, such as a solid polymer electrolyte or solid ceramic electrolyte, is, the solid-state electrolyte may also act as the separator and, therefore, no additional separator is needed.

The cathodes are composed of an active cathode material that takes part in an electrochemical reaction during the operation of the battery. The active cathode materials for lithium metal batteries may be lithium composite oxides and include layered-type materials, such as $LiCoO_2$, $LiNi_{0.8}Co_{0.15}Al_{0.05}O_2$, or $Li_{1-x}Ni_{1-y-z}Co_yMn_zO_2$; olivine-type materials, such as $LiFePO_4$; spinel-type materials, such as $LiMn_2O_4$; and similar materials. The spinel-type materials include those with a structure similar to natural spinal $LiMn_2O_4$, that include a small amount nickel cation in addition to the lithium cation and that, optionally, also include an anion other than manganate. By way of illustration, such materials include those having the formula $LiNi_{(0.5-x)}Mn_{1.5}M_xO_4$, where $0 \leq x \leq 0.2$ and M is Mg, Zn, Co, Cu, Fe, Ti, Zr, Ru, or Cr. Examples of cathode materials for sodium metal batteries include $Na_3V_2(PO_4)_3$, $NaMnO_2$, $NaFePO_4$, and $Na_2S$/activated carbon nanofibers. Examples of cathode materials for magnesium metal batteries include $Mo_3S_4$, $TiSe_2$, $MgFePO_4F$, $MgFeSiO_4$, $MgCo_2O_4$, and $V_2O_5$.

The metal anodes are composed of an active metals (i.e., Li, Na, or Mg), which provides a mobile element and takes part in an electrochemical reaction during the operation of the battery. The metal anodes can be pure, or substantially pure, metal (i.e., pure or substantially pure Li, Na, or Mg) or alloys of the active metal with one or more additional metal elements. In the metal alloys, the alloyed element or elements can be used to control dendrite formation, mechanical properties, surface chemistry, voltage, or other materials properties. For example, lithium may be alloyed with aluminum, indium, or sodium to form a lithium metal anode composed of a lithium metal alloy. Alloyed metal anodes may include a majority or a minority of lithium. In some embodiments of the metal alloys, the active metal makes up a majority (i.e., >50%) of the alloy by weight, while in other embodiments the other metal elements make up a majority of the alloy by weight.

The active anode material is at least partially coated with a continuous or discontinuous anode coating of a metal compound and/or metalloid compound. The coatings allow diffusion of the mobile metal ions (e.g., Li, Na, or Mg ions) between the anode and electrolyte, while blocking diffusion of electrons and other species that cause electrochemical or chemical reactions between the anode and the electrolyte. The coatings may also limit spatial irregularities at the anode-electrolyte interface that can lead to metal dendrites and internal short circuits. The coatings thereby create a more stable anode-electrolyte interface to enhance the durability, cycle life, calendar life, power, and/or safety of the cell. The coating compounds desirably have a high bandgap because compounds with higher bandgaps are more likely to maintain electronic insulation in the harsh chemical environment of a battery. By way of illustration, some of the coating compounds have bandgaps of at least 1 eV. This includes compounds having a bandgap of at least 2 eV, at least 3 eV, at least 4 eV, at least 5 eV, at least 6 eV, at least 7 eV, at least 8 eV, and at least 9 eV.

The coating compounds may be selected from compounds that are stable; exhibit chemical equilibrium with the metal anode; are electronic insulators; and, desirably do not contain radioactive elements. The meaning of the terms "stable", "exhibits chemical equilibrium with the metal anode" and "electronic insulator", as used herein, are provided in Example 1, which described in detail the methods and calculations that can be used to evaluate these properties. Briefly, a coating compound is stable if it has a formation energy lower than any other phase or combination of phases at the composition of the candidate compound, as identified using the convex hull methods. A coating compound exhibits chemical equilibrium with a metal anode if it is not consumed to any significant extent by a chemical reaction with that anode. This is determined by calculating the convex hull for the set of elements defined by the compound and the metal anode and determining if a tie line connects the coating compound with the metal of the anode. The existence of a tie lie indicates that the compound exhibits stable equilibrium with the metal anode. Finally, a coating compound is considered to be an electronic insulator if it has a DFT Kohn-Sham bandgap, as tabulated in the Open Quantum Materials Database of at least 1.0 eV.

These properties of the coating materials also render the coating materials suitable for use as electrolytes in the batteries. Therefore, the coatings are able to act as an additional electrolyte layer in the battery. Alternatively, metal batteries can employ the anode coating materials described herein as electrolytes, rather than, or in addition to, anode coatings.

The compounds include binary, ternary and quaternary metal and/or metalloid oxides, nitrides, halides (e.g., fluorides, chlorides, and bromides), sulfides, and carbides, including compounds in which the metal is an alkali metal, an alkaline earth metal, a transition metal, a post-transition metal, and/or a rare earth metal. Suitable metals include the metal from which the active anode material is composed. The coating compounds may be used as pure single phases, combined as atomically mixed phases, or combined as composite mixed phases.

The oxides are compounds of one or more metal and/or metalloid elements and oxygen. In some embodiments of the coatings, the oxide compounds have the formula MO, where M is a metal, such as, for example, an alkaline earth metal, or a rare earth metal. In some embodiments of the coatings, the oxide compounds have the formula $M_2O_3$, wherein M is a metal, such as a rare earth metal. In some embodiment of the coatings for lithium anodes, the oxide compounds have the formula $LiRO_2$, where R is a rare earth metal. Similarly, in some embodiments of the coatings for sodium anodes, the oxide compounds have the formula $NaRO_2$, where R is a rare earth metal.

The nitrides are compounds of one or more metal and/or metalloid elements and nitrogen. In some embodiments of the coatings for lithium anodes, the nitride compounds have the formula $Li_xMN_4$, where x is 5, 6, or 7 and M is a metal, such as Ta, Nb, W, V, Re, or Mo.

The sulfides are compounds of one or more metal and/or metalloid elements and sulfur. In some embodiments of the coatings for sodium anodes, the sulfide compounds have the formula $NaRS_2$, where R is a rare earth metal.

The chlorides are compounds of one or more metal and/or metalloid elements and chlorine. In some embodiments of the coatings for magnesium anodes, the chloride compounds have the formula $RCl_3$, where R is a rare earth metal.

Similarly, the fluorides are compounds of one or more metal and/or metalloid elements and fluorine; the bromides are compounds of one or more metal and/or metalloid elements and bromine; and the carbides are compounds of one or more metal and/or metalloid elements and carbon.

The performance and lifetime of a battery can be still further enhanced if the coating is chemically stable and exhibits chemical equilibrium with respect to the electrolyte, as well as with the active anode metal. Therefore, in some embodiments of the coated metal anodes, the electrolyte is selected such that the coating compounds are stable and exhibit chemical equilibrium with respect to the electrolyte. This is demonstrated in the Example 2, for certain solid-state electrolytes for lithium batteries.

The compounds can be synthesized and formed as coatings using known methods for forming coatings on anodes and other substrates. The coatings can be formed directly on the anode active material or formed on the electrolyte material and subsequently contacted with the metal anode. For the purposes of this disclosure the latter situation is considered a coating on the metal anode by virtue of the contact of the coating with the surface of a active anode material.

Some embodiments of the coating materials, such as metal oxides and metalloid oxides and nitrides, including binary and ternary oxides and nitrides, can be applied to the anode active material via atomic layer deposition (ALD) using known precursors. By way of illustration, compounds of the formula $M_2O_3$, including compounds where M is a rare earth metal element, can be formed via ALD. Other methods for forming coatings include the solution phase reaction of a cation precursor with an anion precursor in the presence of the anode active material. Because conventional metal anodes take the form of a thin foil, vapor deposition (e.g., chemical vapor deposition, physical vapor deposition, and/or pulsed laser deposition) is well suited for the deposition of the anode coating materials on the anode substrates. However, powder deposition can also be used. Some embodiments of the coating materials can be applied to the anode active material using both external precursors and internal precursors that are alloyed with the metal anode materials and can segregate to the surface of the anode to partially form the coating.

It the metal anode is a particulate material, for example a metal or metal alloy particles embedded in a composite structure, a coated anode can be made by forming a reaction mixture that includes the anode active material particles, a cation precursor, and an anion precursor in a solvent and initiating a precipitation reaction between the cation precursor and the anion precursor to form the anode coating material on the anode active material. If the metal anode is in the form of a thin foil, a mixture of the cation precursor and the anion precursor can be applied to the surface of the foil and the precipitation reaction can be initiated there. Alternatively, the anode coating compounds can be formed in the absence of the anode active material and subsequently combined with the anode active material to form a composite in which the anode coating materials are in contact with and at least partially surround particles of the anode active material. The coating methods can, optionally, include grinding a mixture of anode coating material and anode active material and calcining the product.

The coatings may be sufficiently thick that that the bulk of the coating away from the interface between the anode active material and the anode coating material preserves the nominal coating composition. By way of illustration, some embodiments of the anode coatings have a thickness in the range from 0.1 to 1000 nm, including thicknesses in the range from 0.2 to 500 nm, and from 1 to 200 nm. The amount of anode coating material based on weight may be, for example, in the range from 0.01 to 40% based on the mass of the anode active material. This includes anode coatings in which the amount of anode coating material is in the range from 0.1 to 30%, based on the mass of the anode active material, and further includes anode coatings in which the amount of anode coating material is in the range from 1 to 15%, based on the mass of the anode active material.

The Summary section of this disclosure provides illustrative examples of some embodiments of coated lithium metal anodes and lithium batteries incorporating the coated lithium metal anodes. The immediately following description provides illustrative examples of some embodiments of coated sodium metal anodes and coated magnesium metal anodes, as well as sodium and magnesium batteries incorporating the coated metal anodes.

One embodiment of a coated sodium metal anode includes: a sodium metal anode; and a coating on at least a portion of the sodium metal anode, wherein the coating comprises a rare earth metal oxide, and further wherein the rare earth metal oxide is stable; exhibits chemical equilibrium with the sodium metal anode; and is electrically insulating. The coating can be composed of, for example, a rare earth metal oxide having the formula $R_2O_3$ or the formula $NaRO_2$, where R is a rare earth metal element. Another embodiment of a coated sodium metal anode includes: a sodium metal anode; and a coating on at least a portion of the sodium metal anode, wherein the coating comprises a binary metal oxide selected from, for example, CaO, SrO, YbO, BaO, and combinations thereof, and further wherein the binary metal oxide is stable; exhibits chemical equilibrium with the sodium metal anode; and is electrically insulating. Yet another embodiment of a coated sodium metal anode includes: a sodium metal anode; and a coating on at least a portion of the sodium metal anode, wherein the coating comprises a ternary sodium oxide selected from, for example, of $Na_2ZrO_3$, $Na_4WO_5$, $Na_4SiO_4$, $Na_3BO_3$, $Na_7Al_3O_8$, $Na_5TaO_5$, $Na_5NbO_4$, $Na_5AlO_4$, $Na_3ClO$, $Na_2Hf_2O_5$, $Na_4Br_2O$, and combinations thereof, and further wherein the ternary sodium oxide is stable; exhibits chemical equilibrium with the sodium metal anode; and is electrically insulating. One embodiment of a sodium battery incorporating these coated sodium metal anodes includes: the coated sodium metal anode; a cathode in electrical communication with the coated sodium metal anode; and an electrolyte disposed between the coated sodium metal anode and the cathode.

Another embodiment of a coated sodium metal anode includes: a sodium metal anode; and a coating on at least a portion of the sodium metal anode, wherein the coating comprises a binary metal sulfide selected from, for example, $Na_2S$, SrS, CaS, YbS, BaS, EuS, and combinations thereof, and further wherein the binary metal sulfide is stable; exhibits chemical equilibrium with the sodium metal anode; and is electrically insulating. Another embodiment of a coated sodium metal anode includes: a sodium metal anode; and a coating on at least a portion of the sodium metal anode, wherein the coating comprises a ternary sodium sulfide selected from, for example, NaLiS, $NaLuS_2$, $NaErS_2$, $NaHoS_2$, $NaYS_2$, or $NaTmS_2$, and combinations thereof, and further wherein the ternary sodium sulfide is stable; exhibits chemical equilibrium with the sodium metal anode; and is electrically insulating. One embodiment of a sodium battery incorporating the coated sodium metal anode includes: the coated sodium metal anode; a cathode in electrical communication with the coated sodium metal anode; and an electrolyte disposed between the coated sodium metal anode and the cathode. The electrolyte can be, for example, a sulfide solid electrolyte.

Another embodiment of a coated sodium metal anode includes: a sodium metal anode; and a coating on at least a portion of the sodium metal anode, wherein the coating comprises a metal fluoride, such as LiF, NaF, $EuF_2$, $SrF_2$, $CaF_2$, $YbF_2$, $BaF_2$, or a combination thereof, and further wherein the metal fluoride is stable; exhibits chemical equilibrium with the sodium metal anode; and is electrically insulating. One embodiment of a sodium battery incorporating these coated sodium metal anodes includes: the coated sodium metal anode; a cathode in electrical communication with the coated sodium metal anode; and an electrolyte disposed between the coated sodium metal anode and the cathode.

Another embodiment of a coated sodium metal anode includes: a sodium metal anode; and a coating on at least a portion of the sodium metal anode, wherein the coating comprises a ternary sodium nitride, such as $Na_2CN_2$, $Na_3WN_3$, $Na_3BN_2$, $Na_3MoN_3$, $NaTaN_2$, or a combination thereof, and further wherein the ternary sodium nitride is stable; exhibits chemical equilibrium with the sodium metal anode; and is electrically insulating. One embodiment of a sodium battery incorporating these coated sodium metal anodes includes: the coated sodium metal anode; a cathode in electrical communication with the coated sodium metal anode; and an electrolyte disposed between the coated sodium metal anode and the cathode.

One embodiment of a coated magnesium metal anode includes: a magnesium metal anode; and a coating on at least a portion of the magnesium metal anode, wherein the coating comprises a metal sulfide selected from, for example, $Lu_2MgS_4$, MgS, SrS, CaS, YbS, and combinations thereof, and further wherein the metal sulfide is stable; exhibits chemical equilibrium with the magnesium metal anode; and is electrically insulating. One embodiment of a magnesium battery incorporating the coated magnesium metal anode includes: the coated magnesium metal anode; a cathode in electrical communication with the coated magnesium metal anode; and an electrolyte disposed between the coated magnesium metal anode and the cathode. The electrolyte can be, for example, a sulfide solid electrolyte.

Another embodiment of a coated magnesium metal anode includes: a magnesium metal anode; and a coating on at least a portion of the magnesium metal anode, wherein the coating comprises a ternary magnesium fluoride or a ternary magnesium chloride, such as $KMgF_3$, $NaMgF_3$, $RbMgF_3$, $Mg_3NF_3$, $CsMgCl_3$, $Cs_2MgCl_3$, $K_2MgCl_4$, or a combination thereof, and further wherein the ternary magnesium fluoride or ternary magnesium chloride is stable; exhibits chemical equilibrium with the magnesium metal anode; and is electrically insulating. One embodiment of a magnesium battery incorporating these coated magnesium metal anodes includes: the coated magnesium metal anode; a cathode in electrical communication with the coated magnesium metal anode; and an electrolyte disposed between the coated magnesium metal anode and the cathode.

Another embodiment of a coated magnesium metal anode includes: a magnesium metal anode; and a coating on at least a portion of the magnesium metal anode, wherein the coating comprises a magnesium nitride, such as $Mg_3N_2$, $MgSiN_2$, or a combination thereof, and further wherein the magnesium nitride is stable; exhibits chemical equilibrium with the magnesium metal anode; and is electrically insulating. One embodiment of a magnesium battery incorporating these coated magnesium metal anodes includes: the coated magnesium metal anode; a cathode in electrical communication with the coated magnesium metal anode; and an electrolyte disposed between the coated magnesium metal anode and the cathode.

Another embodiment of a coated magnesium metal anode includes: a magnesium metal anode; and a coating on at least a portion of the magnesium metal anode, wherein the coating comprises a ternary magnesium carbide, such as $MgAl_2C_2$, $MgB_2C_2$, or a combination thereof, and further wherein the ternary magnesium carbide is stable; exhibits chemical equilibrium with the magnesium metal anode; and is electrically insulating. One embodiment of a magnesium battery incorporating these coated magnesium metal anodes includes: the coated magnesium metal anode; a cathode in electrical communication with the coated magnesium metal anode; and an electrolyte disposed between the coated magnesium metal anode and the cathode.

EXAMPLES

Example 1: Coatings for Lithium, Sodium, and Magnesium Metal Anodes

In this example, the Open Quantum Materials Database (OQMD) was screened to identify coatings that exhibit chemical equilibrium with the anode metals and are electronic insulators. The coatings were ranked according to their electronic bandgap. Ninety-two coatings for Li anodes were identified, 118 for Na anodes, and 97 for Mg anodes. Only two compounds that are commonly studied as Li solid electrolytes passed these screens: $Li_3N$ and $Li_7La_3Hf_2O_{12}$. Many of the coatings that were identified are new to the battery literature. Notably, the OQMD is compiled from compounds that had previously been synthesized, therefore this database can be used as a resource for references describing methods of making compounds of the type described herein.

The Open Quantum Materials Database was searched to identify electronically insulating materials that exhibit stable equilibrium with metal anodes made of Li, Na, and Mg. It was found that many materials currently used in Li batteries as electrode coatings or solid electrolytes are reactive with Li metal to form unanticipated reaction products, including electronically conductive phases that facilitate continued transfer of electrons from the anode to the electrolyte. Ninety-two coatings were identified for Li anodes, 118 for Na anodes, and 97 for Mg anodes. These coatings included binary, ternary, and quaternary compounds. For Li anodes, Li-containing ternary coatings were identified, including seven oxides and 21 nitrides, but no fluorides or sulfides. For Na anodes, Na-containing ternaries were identified, including 26 oxides, nine nitrides, and six sulfides, but no fluorides. For Mg anodes, Mg-containing ternaries were identified, including five fluorides, four nitrides, and one sulfide, but no oxides. A variety of chloride, bromide, and carbide coatings for the anodes were also identified. Only two compounds that are commonly studied as Li solid electrolytes passed these screens: $Li_3N$ and $Li_7La_3Hf_2O_{12}$. Many of the coatings that were identified are new to the battery literature.

Methodology
Calculation of Formation Energies

The Open Quantum Materials Database (OQMD) was screened to identify coating materials for Li, Na, and Mg metal anodes. The OQMD is a publicly-available database of more than 440,000 compounds containing various materials properties, calculated using density functional theory (DFT). (See, Saal, J. E.; Kirklin, S.; Aykol, M.; Meredig, B.; Wolverton, C. Materials Design and Discovery with High-Throughput Density Functional Theory: the Open Quantum Materials Database (OQMD). *JOM* 2013, 65 (11), 1501-1509; Kirklin, S.; Saal, J. E.; Meredig, B.; Thompson, A.; Doak, J. W.; Aykol, M.; Rühl, S.; Wolverton, C. The Open Quantum Materials Database (OQMD): Assessing the Accuracy of DFT Formation Energies. *Nature Publishing Group* 2015, 1 (15010), 1-15.) (The details of the various parameters used to perform the DFT calculations are discussed elsewhere. (See, Kirklin, S.; Saal, J. E.; Meredig, B.; Thompson, A.; Doak, J. W.; Aykol, M.; Rühl, S.; Wolverton, C. The Open Quantum Materials Database (OQMD): Assessing the Accuracy of DFT Formation Energies. *Nature Publishing Group* 2015, 1 (15010), 1-15; Grindy, S.; Meredig, B.; Kirklin, S.; Saal, J. E.; Wolverton, C. Approaching Chemical Accuracy with Density Functional Calculations: Diatomic Energy Corrections. *Phys. Rev. B* 2013, 87 (7), 075150; Perdew, J.; Burke, K.; Ernzerhof, M. Generalized Gradient Approximation Made Simple. *Phys. Rev. Lett.* 1996, 77 (18), 3865-3868; Blöchl, P. E. Projector Augmented-Wave Method. *Phys. Rev. B* 1994, 50 (24), 17953; Kresse, G.; Joubert, D. From Ultrasoft Pseudopotentials to the Projector Augmented-Wave Method. *Phys. Rev. B* 1999, 59 (3), 1758; Kresse, G.; Hafner, J. Ab Initio Molecular Dynamics for Liquid Metals. *Phys. Rev. B* 1993, 47 (1), 558-561; Kresse, G.; Hafner, J. Ab Initio Molecular-Dynamics Simulation of the Liquid-Metal-Amorphous-Semiconductor Transition in Germanium. *Phys. Rev. B* 1994, 49 (20), 14251; Kresse, G.; Furthmüller, J. Efficiency of Ab-Initio Total Energy Calculations for Metals and Semiconductors Using a Plane-Wave Basis Set. *Computational Materials Science* 1996, 6, 15-50; Kresse, G.; Furthmüller, J. Efficient Iterative Schemes for Ab Initio Total-Energy Calculations Using a Plane-Wave Basis Set. *Phys. Rev. B* 1996, 54 (16), 11169; Anisimov, V. I.; Zaanen, J.; Andersen, O. K. Band Theory and Mott Insulators: Hubbard U Instead of Stoner I. *Phys. Rev. B* 1991, 44 (3), 943; Anisimov, V.; Solovyev, I.; Korotin, M.; Czyżyk, M.; Sawatzky, G. Density-Functional Theory and NiO Photoemission Spectra. *Phys. Rev. B* 1993, 48 (23), 16929; Liechtenstein, A.; Anisimov, V.; Zaanen, J. Density-Functional Theory and Strong Interactions: Orbital Ordering in Mott-Hubbard Insulators. *Phys. Rev. B* 1995, 52 (8), 5467-5470; Dudarev, S. L.; Botton, G. A.; Savrasov, S. Y.; Humphreys, C. J.; Sutton, A. Electron-Energy-Loss Spectra and the Structural Stability of Nickel Oxide: an LSDA+U Study. *Phys. Rev. B* 1998, 57 (3), 1505-1509.) The formation energy of a compound $A_aB_bC_c \ldots Z_z$, $\Delta H_f$ was calculated using $$\Delta H_f(A_aB_bC_c \ldots Z_z) = E(A_aB_bC_c \ldots Z_z) - \sum_{i=A}^{Z} \alpha_i \mu_i$$

where $E(A_aB_bC_c \ldots Z_z)$ is the DFT energy of the compound from the OQMD, $\alpha_i$ is the atom fraction of element i in the compound, and $\mu_i$ is the chemical potential of element i, from the OQMD. The reference chemical potential of elements whose state at room temperature is different from that at 0 K (gaseous elements, and elements that undergo a phase transformation below room temperature) were fit to experimental formation enthalpies at standard temperature and pressure in the OQMD. (See, Kirklin, S.; Saal, J. E.; Meredig, B.; Thompson, A.; Doak, J. W.; Aykol, M.; Rühl, S.; Wolverton, C. The Open Quantum Materials Database (OQMD): Assessing the Accuracy of DFT Formation Energies. *Nature Publishing Group* 2015, 1 (15010), 1-15.) Further, the free energies of F, O, Cl, N, and Br were adjusted to their reference states at 1 atm and 400 K, by adding enthalpy and entropy corrections from the JANAF Thermochemical Tables. (See, Chase, M. W.; Davies, C. A.; Downey, J. F.; Frurip, D. J.; McDonald, R. A.; Syverud, A. N. *JANAF Thermochemical Tables;* 1985.) The temperature of 400 K was selected to reflect conditions of vapor deposition on lithium metal and to reflect the maximum operating temperature of solid state batteries.

Screening Criteria

The screening strategy that was used employed four main criteria to identify potential anode coatings materials: (a) stability, (b) equilibrium with the anode metal, (c) electronic insulation, and (d) lithium content. Additionally, all compounds with radioactive elements were discarded: Pm, Po, At, Rn, Fr, Ra, Ac, Th, Pa, U, Np, Pu, Am, Cm, and Bk. The screening criteria are described in detail below.

Stability:

The search for anode coatings was limited to compounds that are stable, because stable compounds are most amenable to synthesis. By definition, a candidate compound is stable if it has a formation energy lower than any other phase or combination of phases at the composition of the candidate compound. Stable compounds were identified using the convex hull method, considering all compounds in the OQMD. Stable compounds were further quantified by calculating a numerical value for stability. The stability of a candidate compound was calculated by taking the numerical difference between the formation energy of the candidate compound minus the formation energy of the lowest-energy set of competing phases. The competing phases were determined by considering all compounds in the OQMD, but removing the candidate compound and other phases at the candidate compound's composition, and then calculating the lowest-energy set of phases at the candidate compound's composition. Stability was negative for stable compounds, as illustrated in FIG. 1A.

Figure 1B:
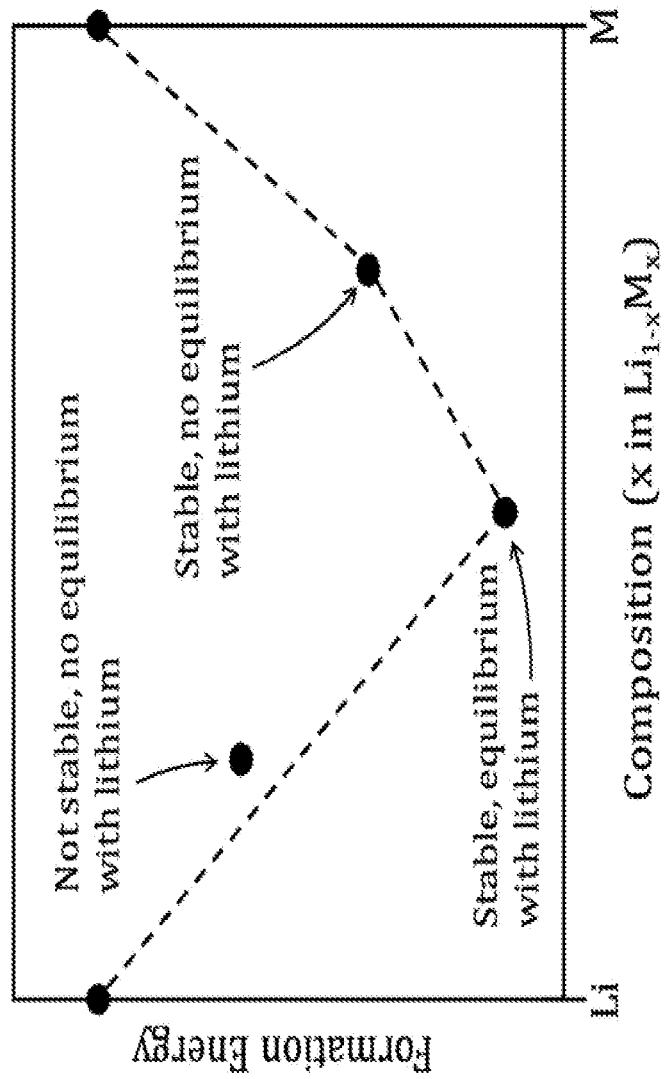

Equilibrium:

In addition to calculating the stability of a compound, it was also determined whether a compound exhibits chemical equilibrium with the anode metals: Li, Na, and Mg. Stability of a compound and equilibrium of the compound with a metal anode are two distinct concepts that are sometimes confused. A given solid electrolyte material may be stable when synthesized in isolation; however, when such a solid electrolyte material is combined with a metal anode, it may still be consumed by a chemical reaction. Such a material is stable, but it does not exhibit equilibrium with the anode metal. To compute whether a compound exhibits equilibrium with an anode metal, the convex hull method was again used. For each candidate compound, the convex hull was calculated for the set of elements defined by the compound plus the anode metal. Within this convex hull, a tie line connecting the candidate compound with the anode metal was searched for. The presence of such a tie line was taken as an indication that the candidate compound does exhibit stable equilibrium with the anode metal. The absence of such a tie line was taken as an indication that the candidate compound does not exhibit stable equilibrium with the anode metal, but rather reacts with the anode metal. Equilibrium with an anode metal is illustrated in FIG. 1B.

Electronic Insulation:

To identify coatings that are electronically insulating, compounds that contain F, O, Cl, N, Br, S, or C were targeted in the search. The DFT Kohn-Sham bandgap was considered, as tabulated in the OQMD. (See, Kohn, W.; Sham, L. J. Self-Consistent Equations Including Exchange and Correlation Effects. *Physical Review* 1965, 140 (4A), A1133-A1138.) Compounds that exhibit a bandgap above 1.0 eV were screened for. This somewhat lenient bandgap value was selected because the Kohn-Sham bandgap with the PBE functional systemically underestimates the experimental bandgap with a mean absolute error of 0.84 eV. (See, Chan, M.; Ceder, G. Efficient Band Gap Prediction for Solids. *Phys. Rev. Lett.* 2010, 105, 196403.) Compounds were ranked according to bandgap because compounds with higher bandgaps are more likely to maintain electronic insulation in the harsh chemical environment of a battery, while compounds with smaller bandgaps may become doped and electronically conductive.

Lithium Content:

Compounds that contain the anode metal were screened for because all notable solid electrolytes in the lithium battery literature contain lithium sublattices, which enable lithium diffusivity. This requirement for Li content was relaxed for binary compounds to expand our results beyond the binaries, such as LiF, etc.

During the screening, many compounds were rejected that lacked equilibrium with lithium metal. These rejected compounds included many that appear in the lithium battery literature as notable solid electrolytes or electrode coatings. A variety of these compounds were examined and their reactions with lithium metal were computed. Reaction products were determined by combining each compound with an excess of lithium metal and computing the equilibrium set of phases. The excess of lithium was specified to reflect a lithium metal anode in equilibrium with a relatively thin coating. Lithium metal anodes are typically micrometers in thickness; whereas, anode coatings are typically nanometers in thickness. $Li_{10}GeP_2S_{12}$ and $LiLaTi_2O_6$ were not available in the OQMD, so for these reactions, formation energies were used from the Materials Project. (See, Jain, A.; Ong, S. P.; Hautier, G.; Chen, W.; Richards, W. D.; Dacek, S.; Cholia, S.; Gunter, D.; Skinner, D.; Ceder, G.; et al. Commentary: the Materials Project: a Materials Genome Approach to Accelerating Materials Innovation. *APL Mater.* 2013, 1, 011002; Ong, S. P.; Wang, L.; Kang, B.; Ceder, G. Li—Fe—P—O2 Phase Diagram From First Principles Calculations. *Chem. Mater.* 2008, 20, 1798-1807; Jain, A.; Hautier, G.; Ong, S. P.; Moore, C. J.; Fischer, C. C.; Persson, K. A.; Ceder, G. Formation Enthalpies by Mixing GGA and GGA+U Calculations. *Phys. Rev. B* 2011, 84, 045115.)

Results and Discussion

It was found that many solid electrolyte and electrode coating materials in the lithium battery literature, including oxides and sulfides, are reactive with lithium metal. Table 1 lists these reactions and corresponding reaction energies, which range from −18 to −714 meV/atom. The list includes two sulfide compounds, which exhibit the two highest reaction energies. Compounds that are reactive with lithium metal include notable solid electrolytes such as $Li_7La_3Zr_2O_{12}$ (LLZO), $LiLaTi_2O_6$ (LLTO), and $Li_{10}GeP_2S_{12}$ (LGPS) as well as notable electrode coatings such as $Al_2O_3$, $Li_3PO_4$, and $LiAlO_2$. Each compound yields two or three reaction products including $Li_2O$ for oxides and $Li_2S$ for sulfides. Besides $Li_2O$ or $Li_2S$, the remaining reaction products typically include at least one phase that is electronically conductive. These electronically conductive phases, when formed on the anode surface, facilitate electron transfer from the anode to the electrolyte. This electron transfer allows continued reactivity and prevents passivation of the anode/electrolyte interface. Only one compound in Table 1, LLZO, yields reaction products that are all electronically insulating and therefore capable of passivating the surface of lithium metal. This is consistent with experiments reported by Luntz et al. A list of solid electrolytes was considered, including LLZO, LGPS, lithium phosphorous oxynitride (LiPON), and $Li_3ClO$ and it was found that only LLZO "appears to be chemically stable to reduction by lithium metal." (See, Luntz, A. C.; Voss, J.; Reuter, K. Interfacial Challenges in Solid-State Li Ion Batteries. *J. Phys. Chem. Lett.* 2015, 6, 4599-4604.) The results support and clarify this experimental finding, showing that LLZO is resistant to reduction by lithium metal due to passivation. However, anode coatings at the interface between lithium metal and LLZO can improve the properties of the interface and improve battery performance.

TABLE 1

Compounds that are commonly tested as electrode coatings and solid electrolyes in lithium batteries often react with lithium metal anodes. The corresponding reactions and reaction energies (meV/atom) are listed. Most reaction products include electronically conductive phases, which can hinder passivation of the lithium metal surface and facilitate further reactivity. The existence of such conductive reaction products is indicated in the last column.

| Compound | Reaction | $\Delta E^{rxn}$ | Conductive |
|---|---|---|---|
| $Li_3PS_4$ | $Li_3PS_4 + 8*Li \rightarrow 4*Li_2S + Li_3P$ | −714 | Yes |
| $Li_{10}GeP_2S_{12}$ | $Li_{10}GeP_2S_{12} + 23.75*Li \rightarrow 12*Li_2S + 2*Li_3P + 0.25*Li_{15}Ge_4$ | −642 | Yes |
| ZnO | $ZnO + 3*Li \rightarrow Li_2O + LiZn$ | −613 | Yes |
| $Li_3PO_4$ | $Li_3PO_4 + 8*Li \rightarrow 4*Li_2O + Li_3P$ | −338 | Yes |
| $SiO_2$ | $SiO_2 + 4\frac{1}{3}*Li \rightarrow 2*Li_2O + \frac{1}{3}*Li_{21}Si_5$ | −332 | Yes |
| $LiLaTi_2O_6$ | $LiLaTi_2O_6 + 14/3*Li \rightarrow 17/6*Li_2O + LaTiO_3 + 1/6*Ti_6O$ | −164 | Yes |
| $Al_2O_3$ | $Al_2O_3 + 10.5*Li \rightarrow 3*Li_2O + 0.5*Li_9Al_4$ | −152 | Yes |
| $Li_7La_3Zr_2O_{12}$ (LLZO) | $Li_7La_3Zr_2O_{12} + 2*Li \rightarrow 4.5*Li_2O + 0.5*La_2O_3 + 2*LaZrO_3$ | −138 | No |
| $Li_4SiO_4$ | $Li_4SiO_4 + 4\frac{1}{3}*Li \rightarrow 4*Li_2O + \frac{1}{3}*Li_{21}Si_5$ | −105 | Yes |
| $LiAlO_2$ | $LiAlO_2 + 2\frac{1}{4}*Li \rightarrow 2*Li_2O + \frac{1}{4}*Li_9Al_4$ | −62 | Yes |
| MgO | $MgO + 7*Li \rightarrow Li_2O + Li_5Mg$ | −18 | Yes |

The tendency of oxide and sulfide compounds to react with lithium metal to form $Li_2O$ or $Li_2S$ highlights the difficulty in finding compounds that exhibit equilibrium with lithium metal. This tendency is illustrated by the Li—Al—O, Li—Si—O, Li—P—O, and Li—P—S phase diagrams shown in FIGS. 2A, 2B, 2C, and 2D, respectively. These phase diagrams contain a variety of ternary phases, which might otherwise have good properties for coatings, except that none of these phases share a tie line with Li metal. In these phase diagrams, Li metal shares tie lines only with $Li_2O$ or $Li_2S$ plus metallic phases, which prevent passivation.

Ninety-two promising coatings for Li metal anodes were identified, as well as 118 promising coatings for Na metal anodes, and 97 promising coatings for Mg anodes. These coatings include binary, ternary, and quaternary compounds. The tally of coatings is resolved for each anode/anion pair in Table 2. At least one binary coating passed the screens for each anode/anion pair. Ternary compounds passed the screens for all pairs except Li/F, Na/F, Li/S, and Mg/O. Quaternary compounds passed the screens only for Li/O, Li/N, Li/C, Na/O, and Na/N. Some compounds that passed the screens contained multiple anions from the list, including six coatings identified for Li metal, six coatings identified for Na metal, and one coating identified for Mg metal.

Nine pentary compounds passed the screens across the Li/N, Li/Br, Li/C, and Na/O pairs, but all of these pentaries had low concentrations of Li and Na, for example, $LiEu_2CBr_3N_2$ or $KNaLaTaO_5$. Therefore, an additional screen was imposed to exclude compounds with five or more elements.

TABLE 2

Tally of compounds that were identified as promising coatings for Li, Na, and Mg metal anodes. The tally is resolved according to the anode metal, the anion, and the number of elements in the compound.

| | | Anions | | | | | | |
|---|---|---|---|---|---|---|---|---|
| Anodes | | F | O | Cl | N | Br | S | C |
| Li | Binaries | 5 | 16 | 9 | 4 | 9 | 6 | 1 |
| | Ternaries | 0 | 7 | 1 | 21 | 2 | 0 | 2 |
| | Quaternaries | 0 | 4 | 0 | 10 | 0 | 0 | 1 |
| Na | Binaries | 7 | 24 | 5 | 10 | 5 | 7 | 3 |

TABLE 2-continued

Tally of compounds that were identified as promising coatings for Li, Na, and Mg metal anodes. The tally is resolved according to the anode metal, the anion, and the number of elements in the compound.

| | | Anions | | | | | | |
|---|---|---|---|---|---|---|---|---|
| Anodes | | F | O | Cl | N | Br | S | C |
| | Ternaries | 0 | 26 | 1 | 9 | 1 | 6 | 1 |
| | Quaternaries | 0 | 13 | 0 | 6 | 0 | 0 | 0 |
| Mg | Binaries | 11 | 14 | 21 | 4 | 18 | 11 | 2 |
| | Ternaries | 5 | 0 | 4 | 4 | 1 | 1 | 2 |
| | Quaternaries | 0 | 0 | 0 | 0 | 0 | 0 | 0 |

For Li metal anodes, Tables 3-9 list the binary and ternary compounds that passed the screens containing F, O, Cl, N, Br, S, and C anions, respectively. Table 10 lists all quaternary compounds for lithium metal anodes, which included O, N, and C anions. Across all 92 compounds that passed the screens for Li anodes, only two compounds are commonly studied as solid electrolytes: $Li_3N$ and $Li_7La_3Hf_2O_{12}$. $Li_3N$ is known to exhibit high Li diffusivity. However, the low bandgap for $Li_3N$ (1.2 eV by DFT, 2.2 eV by experiment) may be susceptible to electronic doping on a Li metal anode. Furthermore, $Li_3N$ is not chemically stable with many electrolytes. $Li_7La_3Hf_2O_{12}$ is a lesser-known member of the garnet family, which also contains compounds such as $Li_7La_3Zr_2O_{12}$, $Li_5La_3Nb_2O_{12}$, and $Li_5La_3Ta_2O_{12}$, which have received more attention in the solid electrolyte literature. The finding of equilibrium with Li metal for the garnet $Li_7La_3Hf_2O_{12}$ is somewhat surprising, given that the better-studied $Li_7La_3Zr_2O_{12}$ garnet does not exhibit equilibrium with Li metal. The competing phases for $Li_7La_3Hf_2O_{12}$ are $Li_2O$, $La_2O_3$, and $Li_2HfO_3$. All three of these competing phases also exhibit equilibrium with Li metal, providing additional assurance for $Li_7La_3Hf_2O_{12}$ as a robust coating on Li metal. Also proposed is a $Li_7La_3M_2O_{12}$ (M=Hf, Zr) garnet solid electrolyte that is rich in Hf near the anode for chemical equilibrium but rich in Zr away from the anode for greater Li conductivity.

According to the findings, $Li_7La_3Hf_2O_{12}$ qualifies as a coating and therefore may be employed as a solid electrolyte in direct contact with Li metal without the need for any other intervening anode coating. However, for other electrolytes that lack equilibrium with Li metal, such as those listed in Table 1 as well as various liquid electrolytes, an intervening anode coating was needed to prevent electrochemical reduction of the electrolyte. The compounds identified in Tables 3-10 can be employed as anode coatings to stabilize such anode/electrolyte interfaces.

Throughout the 92 compounds identified as coatings for Li metal anodes, a few classes of compounds can be distinguished. Within the 16 binary oxides, 11 are members of $R_2O_3$ where R is a rare earth elements including Y, Lu, Dy, Tm, Ho, Er, Gd, Nd, Sm, Pr, and La. CaO is unique among the oxide coatings for lithium metal in that it contains only low-cost and non-toxic elements. Within the seven ternary oxides, six are members of $LiRO_2$, where R is a rare earth element including Gd, Dy, Tb, Ho, Er, and Sc. The remaining ternary oxide is $Li_2HfO_3$, which belongs to the set of competing phases for the garnet $Li_7La_3Hf_2O_{12}$. Within the 21 ternary nitrides, six are members of $Li_xMN_4$, where x=5, 6, or 7 and M is a transition metal including Ta, Nb, W, V, Re, and Mo. These nitride compounds are similar in composition to $Li_3N$, which is known to have good Li conductivity. However, these compounds have larger bandgaps than $Li_3N$, which may improve their ability to block electron transfer. And, unlike $Li_3N$, many of these compounds exhibit stable equilibrium with oxide solid electrolytes.

Tables 3-10 list coatings for Li metal anodes. Tables 3-9 list binary and ternary coatings containing F, O, Cl, N, Br, S, and C anions, respectively. Table 10 lists quaternary coatings, which include N, O, and C anions. Electronic bandgaps and stabilities are reported in eV. Stabilities are calculated with respect to the nearest-energy set of competing phases. Space group and prototype structure are also listed.

TABLE 3

Fluoride binary and ternary coatings for Li metal anodes.

| | Band Gap | Stability | Competing Phases | Space Group | Prototype |
|---|---|---|---|---|---|
| | | | Binary Compounds | | |
| LiF | 9.56 | −1.050 | $LiF_2$—$Li_3F_2$ | $Fm\bar{3}m$ | B1 |
| $EuF_2$ | 7.94 | −0.925 | $Eu_2F_3$—$EuF_3$ | $Fm\bar{3}m$ | $CaF_2$ |
| $SrF_2$ | 7.43 | −1.232 | $SrF$—$SrF_3$ | $Fm\bar{3}m$ | $CaF_2$ |
| $CaF_2$ | 7.41 | −0.965 | $CaF_3$—$Ca_2F_3$ | $R\bar{3}m$ | None |
| $YbF_2$ | 7.31 | −1.287 | $YbF_3$—$YbF$ | $P4_2/mnm$ | C4 |

TABLE 4

Oxide binary and ternary coatings for Li metal anodes.

| | Band Gap | Stability | Competing Phases | Space Group | Prototype |
|---|---|---|---|---|---|
| | | | Binary Compounds | | |
| BeO | 7.90 | −1.584 | Be—$Be_2O_3$ | $P6_3mc$ | B4 |
| $Li_2O$ | 5.08 | −0.657 | LiO—$Li_3O$ | $R\bar{3}m$ | None |
| $Y_2O_3$ | 4.37 | −0.823 | $YO_2$—$Y_4O_5$ | $Ia\bar{3}$ | $Mn_2O_3$ |
| $Lu_2O_3$ | 4.22 | −1.056 | $Lu_4O_5$—$O_2$ | $Ia\bar{3}$ | $Mn_2O_3$ |
| $Dy_2O_3$ | 4.17 | −0.989 | $Dy_4O_5$—$O_2$ | $Ia\bar{3}$ | $Mn_2O_3$ |
| $Tm_2O_3$ | 4.16 | −0.859 | $TmO_2$—$Tm_4O_5$ | $I2_13$ | $Sm_2O_3$ |
| $Ho_2O_3$ | 4.14 | −1.011 | $Ho_4O_5$—$O_2$ | $Ia\bar{3}$ | $Mn_2O_3$ |
| $Er_2O_3$ | 4.12 | −1.016 | $Er_4O_5$—$O_2$ | $Ia\bar{3}$ | $Mn_2O_3$ |
| $Gd_2O_3$ | 4.08 | −0.969 | $Gd_4O_5$—$O_2$ | $Ia\bar{3}$ | $Mn_2O_3$ |
| $Nd_2O_3$ | 4.05 | −0.571 | $NdO_2$—NdO | $Ia\bar{3}$ | $Mn_2O_3$ |
| $Sm_2O_3$ | 3.98 | −0.824 | $Sm_4O_5$—$SmO_2$ | $Ia\bar{3}$ | $Mn_2O_3$ |
| $Pr_2O_3$ | 3.91 | −0.419 | $Pr_7O_{12}$—PrO | $Ia\bar{3}$ | $Mn_2O_3$ |
| $La_2O_3$ | 3.81 | −1.134 | LaO—$LaO_3$ | $Ia\bar{3}$ | $Mn_2O_3$ |
| CaO | 3.75 | −1.134 | $Ca_2O_3$—$Ca_2O$ | $Fm\bar{3}m$ | B1 |
| YbO | 3.52 | −0.950 | $Yb_4O_5$—$Yb_3O_2$ | $Fm\bar{3}m$ | B1 |
| EuO | 2.81 | −0.797 | $Eu_2O$—$Eu_3O_4$ | $Fm\bar{3}m$ | B1 |
| | | | Ternary Lithium-Containing Compounds | | |
| $LiGdO_2$ | 4.90 | −0.004 | $Li_2O$—$Gd_2O_3$ | Pnma | $SrZnO_2$ |
| $Li_2HfO_3$ | 4.86 | −0.096 | $Li_2O$—$Li_8Hf_4O_{11}$—$Li_6Hf_4O_{11}$ | C2/m | None |
| $LiDyO_2$ | 4.83 | −0.012 | $Li_2O$—$Dy_2O_3$ | Pnma | $SrZnO_2$ |
| $LiTbO_2$ | 4.83 | −0.008 | $Li_2O$—$Tb_2O_3$ | Pnma | $SrZnO_2$ |
| $LiHoO_2$ | 4.51 | −0.001 | $Li_2O$—$Ho_2O_3$ | $P2_1/c$ | $YLiO_2$ |
| $LiErO_2$ | 4.51 | −0.011 | $Li_2O$—$Er_2O_3$ | $P2_1/c$ | $YLiO_2$ |
| $LiScO_2$ | 4.32 | −0.090 | $Li_2O$—$Sc_2O_3$ | $I4_1/amd$ | $LiFeO_2$-alpha |

TABLE 5

Chloride binary and ternary coatings for Li metal anodes.

| | Band Gap | Stability | Competing Phases | Space Group | Prototype |
|---|---|---|---|---|---|
| Binary Compounds | | | | | |
| LiCl | 6.25 | −0.772 | $Li_3Cl_2$—$LiCl_2$ | $F\bar{4}3m$ | B3 |
| $BaCl_2$ | 5.69 | −0.648 | $BaCl_3$—$Ba_2Cl_3$ | $Fm\bar{3}m$ | $CaF_2$ |
| $YbCl_2$ | 5.63 | −0.250 | $Yb_6Cl_{13}$—Yb | $P4_2/mnm$ | C4 |
| $SrCl_2$ | 5.53 | −0.962 | $SrCl$—$SrCl_3$ | $Fm\bar{3}m$ | $CaF_2$ |
| KCl | 5.30 | −0.732 | $KCl_2$—$K_3Cl_2$ | $Fm\bar{3}m$ | B1 |
| $EuCl_2$ | 5.19 | −0.837 | $EuCl$—$EuCl_3$ | Pnma | $PbCl_2$ |
| NaCl | 5.18 | −0.727 | $NaCl_2$—$Na_3Cl_2$ | $Fm\bar{3}m$ | B1 |
| CsCl | 5.08 | −0.629 | $Cs_3Cl_2$—$CsCl_2$ | $Fm\bar{3}m$ | B1 |
| RbCl | 4.98 | −0.715 | $Rb_3Cl_2$—$Cl_2$ | $R\bar{3}m$ | $L1_1$ |
| Ternary Lithium-Containing Compounds | | | | | |
| $Li_4NCl$ | 2.02 | −0.007 | $Li_3N$—$Li_5NCl_2$ | $R\bar{3}m$ | None |

TABLE 6

Nitride binary and ternary coatings for Li metal anodes.

| | Band Gap | Stability | Competing Phases | Space Group | Prototype |
|---|---|---|---|---|---|
| Binary Compounds | | | | | |
| AlN | 4.34 | −1.275 | $Al_3N$—$N_2$ | $P6_3mc$ | B4 |
| $Be_3N_2$ | 3.52 | −0.710 | $Be_2N$—$N_2$ | $Ia\bar{3}$ | $Mn_2O_3$ |
| LaN | 1.29 | −0.647 | $La_2N$—$N_2$ | $P6_3mc$ | B4 |
| $Li_3N$ | 1.22 | −0.319 | Li—$N_2$ | P6/mmm | $Li_3N$ |
| Ternary Lithium-Containing Compounds | | | | | |
| $Li_2CN_2$ | 4.11 | −0.404 | $Li_3N$—$LiCN$—$N_2$ | I4/mmm | None |
| $Li_2SiN_2$ | 4.07 | −0.131 | $Li_3N$—$LiSi_2N_3$ | Pbca | None |
| $Li_3BN_2$ | 3.67 | −0.176 | $Li_3N$—BN | $P2_1/c$ | $Na_3BN_2$ |
| $Li_7TaN_4$ | 3.51 | −0.079 | $Li_3N$—$Li_4TaN_3$ | $Pa\bar{3}$ | $Li_7TaN_4$ |
| $Li_7NbN_4$ | 3.51 | −0.278 | $Li_3N$—$Nb_5N_6$—$N_2$ | $Pa\bar{3}$ | $Li_7TaN_4$ |
| $Li_6WN_4$ | 3.38 | −0.485 | $Li_3N$—W—$N_2$ | $P4_2/nmc$ | $Li_6ZnO_4$ |
| $Li_7VN_4$ | 3.32 | −0.293 | $Li_3N$—VN—$N_2$ | $Pa\bar{3}$ | $Li_7TaN_4$ |
| LiBeN | 3.00 | −0.115 | $Li_3N$—$Be_3N_2$ | $P2_1/c$ | None |
| $Li_5ReN_4$ | 2.92 | −0.365 | $Li_3N$—Re—$N_2$ | Pmmn | $Li_5AlO_4$ |
| $Li_6MoN_4$ | 2.78 | −0.325 | $Li_3N$—$LiMoN_2$—$N_2$ | $P4_2/nmc$ | $Li_6ZnO_4$ |
| $Li_8TeN_2$ | 2.63 | −0.025 | $Li_3N$—$Li_2Te$ | $I4_1md$ | None |
| LiMgN | 2.56 | −0.058 | $Li_3N$—$Mg_3N_2$ | Pnma | None |
| $Li_5Br_2N$ | 2.46 | −0.008 | LiBr—$Li_{10}BrN_3$ | Immm | None |
| $Li_3ScN_2$ | 2.44 | −0.049 | $Li_3N$—ScN | $Ia\bar{3}$ | $AlLi_3N_2$ |
| $Li_4NCl$ | 2.02 | −0.007 | $Li_3N$—$Li_5NCl_2$ | $R\bar{3}m$ | None |
| $Li_4HN$ | 1.98 | −0.002 | $Li_3N$—LiH | $I4_1/a$ | $CaWO_4$ |
| $Li_8SeN_2$ | 1.89 | −0.001 | $Li_3N$—$Li_2Se$ | $I4_1md$ | None |
| $Li_2ZrN_2$ | 1.73 | −0.221 | $Li_3N$—$Zr_3N_4$ | $P\bar{3}m1$ | $La_2O_3$ |
| LiCaN | 1.64 | −0.049 | $Li_3N$—$Ca_3N_2$ | Pnma | None |
| $Li_{10}BrN_3$ | 1.54 | −0.005 | $Li_3N$—$Li_5Br_2N$ | $P\bar{6}m2$ | None |
| $SrLi_4N_2$ | 1.10 | −0.016 | $Li_3N$—SrLiN | $I4_1/amd$ | $Li_4SrN_2$ |

TABLE 7

Bromide binary and ternary coatings for Li metal anodes.

| | Band Gap | Stability | Competing Phases | Space Group | Prototype |
|---|---|---|---|---|---|
| Binary Compounds | | | | | |
| LiBr | 5.15 | −0.673 | $LiBr_2$—$Li_3Br_2$ | $F\bar{4}3m$ | B3 |
| $YbBr_2$ | 4.80 | −0.783 | $YbBr_3$—YbBr | Pnnm | None |
| $SrBr_2$ | 4.72 | −0.827 | $SrBr_3$—SrBr | Pnma | $PbCl_2$ |
| $BaBr_2$ | 4.48 | −0.557 | $Ba_2Br_3$—$BaBr_3$ | Pnma | $PbCl_2$ |
| KBr | 4.45 | −0.622 | $K_3Br_2$—$KBr_2$ | $Fm\bar{3}m$ | NaCl |
| RbBr | 4.42 | −0.613 | $Rb_3Br_2$—$RbBr_2$ | $Fm\bar{3}m$ | B1 |
| CsBr | 4.41 | −0.543 | $CsBr_3$—$Cs_3Br_2$ | $Fm\bar{3}m$ | B1 |
| $EuBr_2$ | 4.40 | −0.812 | EuBr—$EuBr_3$ | P4/n | $SrBr_2$ |
| NaBr | 4.36 | −0.639 | $NaBr_3$—$Na_3Br_2$ | $Fm\bar{3}m$ | B1 |
| Ternary Lithium-Containing Compounds | | | | | |
| $Li_5Br_2N$ | 2.46 | −0.008 | LiBr—$Li_{10}BrN_3$ | Immm | None |
| $Li_{10}BrN_3$ | 1.54 | −0.005 | $Li_3N$—$Li_5Br_2N$ | $P\bar{6}m2$ | None |

TABLE 8

Sulfide binary and ternary coatings for Li metal anodes.

| | Band Gap | Stability | Competing Phases | Space Group | Prototype |
|---|---|---|---|---|---|
| Binary Compounds | | | | | |
| $Li_2S$ | 3.66 | −0.561 | $Li_3S$—LiS | $Fm\bar{3}m$ | None |
| SrS | 2.57 | −0.666 | $SrS_2$—$Sr_3S_2$ | $Fm\bar{3}m$ | B1 |
| CaS | 2.50 | −0.988 | $Ca_2S$—$Ca_2S_3$ | $Fm\bar{3}m$ | B1 |
| YbS | 2.33 | −0.431 | $Yb_3S_2$—$Yb_7S_8$ | $Fm\bar{3}m$ | None |
| BaS | 2.24 | −0.594 | $Ba_2S$—$Ba_2S_3$ | $Fm\bar{3}m$ | B1 |
| EuS | 2.07 | −0.701 | $Eu_2S$—$Eu_3S_4$ | $Fm\bar{3}m$ | NaCl |

TABLE 9

Carbide binary and ternary coatings for Li metal anodes.

| | Band Gap | Stability | Competing Phases | Space Group | Prototype |
|---|---|---|---|---|---|
| Binary Compounds | | | | | |
| $Be_2C$ | 1.41 | −0.234 | Be—C | $Fm\bar{3}m$ | $CaF_2$ |
| Ternary Lithium-Containing Compounds | | | | | |
| $Li_2CN_2$ | 4.11 | −0.404 | $Li_3N$—LiCN—$N_2$ | I4/mmm | None |
| LiBC | 1.22 | −0.270 | $LiB_6C$—C—Li | $P6_3/mmc$ | KZnAs |

TABLE 10

Quaternary coatings for lithium metal anodes.

| | Band Gap | Stability | Competing Phases | Space Group | Prototype |
|---|---|---|---|---|---|
| Oxide Compounds | | | | | |
| $Li_7La_3Hf_2O_{12}$ | 4.68 | −0.006 | $Li_2O$—$Li_2HfO_3$—$La_2O_3$ | $I4_1/acd$ | None |
| $Li_{16}Nb_2N_8O$ | 3.73 | −0.004 | $Li_2O$—$Li_7NbN_4$ | $R\bar{3}$ | $Li_{16}Ta_2N_8O$ |
| $Li_{16}Ta_2N_8O$ | 3.53 | −0.005 | $Li_2O$—$Li_7TaN_4$ | $R\bar{3}$ | $Li_{16}Ta_2N_8O$ |
| $LiSmEu_2O_4$ | 3.05 | −0.006 | $Li_2O$—EuO—$Sm_2O_3$ | Pnma | None |

TABLE 10-continued

Quaternary coatings for lithium metal anodes.

| | Band Gap | Stability | Competing Phases | Space Group | Prototype |
|---|---|---|---|---|---|
| Nitride Compounds | | | | | |
| $Li_{16}Nb_2N_8O$ | 3.73 | −0.004 | $Li_2O$—$Li_7NbN_4$ | $R\bar{3}$ | $Li_{16}Ta_2N_8O$ |
| $Li_{16}Ta_2N_8O$ | 3.53 | −0.005 | $Li_2$—$Li_7TaN_4$ | $R\bar{3}$ | $Li_{16}Ta_2N_8O$ |
| $Li_5La_5Si_4N_{12}$ | 2.68 | −0.046 | $LaN$—$La_5Si_3N_9$—$Li_2SiN_2$ | $P\bar{4}b2$ | None |
| $Li_4Ca_3Si_2N_6$ | 2.58 | −0.054 | $Li_2SiN_2$—$LiCaN$—$Ca_5Si_2N_6$ | $C2/m$ | None |
| $Sr_4LiB_3N_6$ | 2.47 | −0.241 | $BN$—$Sr_2N$—$Li_3BN_2$—$SrN$ | $Im\bar{3}m$ | $Sr_9B_6N_{12}$ |
| $Li_5Ce_5Si_4N_{12}$ | 2.43 | −0.039 | $Li_2SiN_2$—$CeN$—$Ce_3Si_6N_{11}$ | $P\bar{4}b2$ | None |
| $LiEu_4B_3N_6$ | 2.40 | −0.058 | $Li_3BN_2$—$Eu_3B_2N_4$ | $Im\bar{3}m$ | $Sr_9B_6N_{12}$ |
| $LiCa_4B_3N_6$ | 2.40 | −0.081 | $Ca_3BN_3$—$Li_3BN_2$—$BN$ | $Im\bar{3}m$ | $Sr_9B_6N_{12}$ |
| $Sr_3Li_4Si_2N_6$ | 2.22 | −0.062 | $SrLiN$—$SrLi_2Si_2N_4$ | $C2/m$ | None |
| $SrLi_2CrN_3$ | 1.09 | −0.265 | $Li_3N$—$Sr_3CrN_3$—$CrN$—$N_2$ | $Pbca$ | $TeCl_2SSeN_2$ |
| Carbide Compounds | | | | | |
| $LiCa_2HC_3$ | 1.50 | −0.140 | $Ca$—$CaH_2$—$Li_2Ca$—$C$ | $P4/mbm$ | None |

Tables 11-18 list coatings for Na metal anodes. Tables 11-17 list binary and ternary coatings containing F, O, Cl, N, Br, S, and C anions, respectively. Table 18 lists quaternary coatings, which include N and O anions. Electronic band-gaps and stabilities are reported in eV. Stabilities are calculated with respect to the nearest-energy set of competing phases. Space group and prototype structure are also listed.

TABLE 11

Fluoride binary and ternary coatings for Na metal anodes.

| | Band Gap | Stability | Competing Phases | Space Group | Prototype |
|---|---|---|---|---|---|
| Binary Compounds | | | | | |
| LiF | 9.56 | −1.050 | $LiF_2$—$Li_3F_2$ | $Fm\bar{3}m$ | B1 |
| $EuF_2$ | 7.94 | −0.925 | $Eu_2F_3$—$EuF_3$ | $Fm\bar{3}m$ | $CaF_2$ |

TABLE 11-continued

Fluoride binary and ternary coatings for Na metal anodes.

| | Band Gap | Stability | Competing Phases | Space Group | Prototype |
|---|---|---|---|---|---|
| $SrF_2$ | 7.43 | −1.232 | $SrF$—$SrF_3$ | $Fm\bar{3}m$ | $CaF_2$ |
| $CaF_2$ | 7.41 | −0.965 | $CaF_3$—$Ca_2F_3$ | $R\bar{3}m$ | None |
| $YbF_2$ | 7.31 | −1.287 | $YbF_3$—$YbF$ | $P4_2/mnm$ | C4 |
| $BaF_2$ | 7.05 | −0.846 | $BaF_3$—$Ba_2F_3$ | $Fm\bar{3}m$ | None |
| NaF | 6.65 | −0.908 | $Na_3F_2$—$NaF_2$ | $Fm\bar{3}m$ | B1 |

TABLE 12

Oxide binary and ternary coatings for Na metal anodes.

| | Band Gap | Stability | Competing Phases | Space Group | Prototype |
|---|---|---|---|---|---|
| Binary Compounds | | | | | |
| BeO | 7.90 | −1.584 | $Be$—$Be_2O_3$ | $P6_3mc$ | B4 |
| $Li_2O$ | 5.08 | −0.657 | $LiO$—$Li_3O$ | $R\bar{3}m$ | None |
| MgO | 4.97 | −1.010 | $Mg_2O$—$Mg_4O_5$ | $Fm\bar{3}m$ | B1 |
| $Y_2O_3$ | 4.37 | −0.823 | $Y_4O_5$—$YO_2$ | $Ia\bar{3}$ | $Mn_2O_3$ |
| $HfO_2$ | 4.29 | −0.784 | $Hf_2O_3$—$Hf_2O_5$ | $P2_1/c$ | $ZrO_2$ |
| $Lu_2O_3$ | 4.22 | −1.056 | $Lu_4O_5$—$O_2$ | $Ia\bar{3}$ | $Mn_2O_3$ |
| $Dy_2O_3$ | 4.17 | −0.989 | $Dy_4O_5$—$O_2$ | $Ia\bar{3}$ | $Mn_2O_3$ |
| $Tm_2O_3$ | 4.16 | −0.859 | $TmO_2$—$Tm_4O_5$ | $I2_13$ | $Sm_2O_3$ |
| $Ho_2O_3$ | 4.14 | −1.011 | $Ho_4O_5$—$O_2$ | $Ia\bar{3}$ | $Mn_2O_3$ |
| $Sc_2O_3$ | 4.12 | −0.840 | $ScO_2$—$Sc_4O_5$ | $Ia\bar{3}$ | $Mn_2O_3$ |
| $Er_2O_3$ | 4.12 | −1.016 | $Er_4O_5$—$O_2$ | $Ia\bar{3}$ | $Mn_2O_3$ |
| $Tb_2O_3$ | 4.09 | −0.488 | $TbO$—$Tb_7O_{12}$ | $Ia\bar{3}$ | $Mn_2O_3$ |
| $Gd_2O_3$ | 4.08 | −0.969 | $Gd_4O_5$—$O_2$ | $Ia\bar{3}$ | $Mn_2O_3$ |
| $Nd_2O_3$ | 4.05 | −0.571 | $NdO_2$—$NdO$ | $Ia\bar{3}$ | $Mn_2O_3$ |
| $Sm_2O_3$ | 3.98 | −0.824 | $Sm_4O_5$—$SmO_2$ | $Ia\bar{3}$ | $Mn_2O_3$ |
| $Pr_2O_3$ | 3.91 | −0.419 | $Pr_7O_{12}$—$PrO$ | $Ia\bar{3}$ | $Mn_2O_3$ |
| $Ce_2O_3$ | 3.81 | −0.409 | $Ce_7O_{12}$—$CeO$ | $Ia\bar{3}$ | $Mn_2O_3$ |
| $La_2O_3$ | 3.81 | −1.134 | $LaO$—$LaO_3$ | $Ia\bar{3}$ | $Mn_2O_3$ |
| CaO | 3.75 | −1.134 | $Ca_2O_3$—$Ca_2O$ | $Fm\bar{3}m$ | B1 |
| SrO | 3.52 | −0.801 | $Sr_3O_2$—$Sr_4O_5$ | $Fm\bar{3}m$ | B1 |
| YbO | 3.52 | −0.950 | $Yb_3O_2$—$Yb_4O_5$ | $Fm\bar{3}m$ | B1 |

TABLE 12-continued

Oxide binary and ternary coatings for Na metal anodes.

| | Band Gap | Stability | Competing Phases | Space Group | Prototype |
|---|---|---|---|---|---|
| EuO | 2.81 | −0.797 | $Eu_2O$—$Eu_3O_4$ | $Fm\bar{3}m$ | B1 |
| $Na_2O$ | 2.22 | −0.406 | NaO—$Na_3O$ | $Fm\bar{3}m$ | $CaF_2$ |
| BaO | 2.10 | −0.710 | $Ba_4O_5$—$Ba_2O$ | $Fm\bar{3}m$ | B1 |
| Ternary Sodium-Containing Compounds | | | | | |
| $Na_2ZrO_3$ | 4.51 | −0.110 | $Na_8Zr_4O_{11}$—$Na_6Zr_2O_7$—$ZrO_2$ | C2/m | None |
| $NaYO_2$ | 4.49 | −0.099 | $Na_2O$—$Y_2O_3$ | C2/c | None |
| $NaErO_2$ | 4.44 | −0.115 | $Na_2O$—$Er_2O_3$ | C2/c | $NaErO_2$ |
| $NaTbO_2$ | 4.17 | −0.103 | $Na_2O$—$Tb_2O_3$ | $I4_1/amd$ | $LiFeO_2$-alpha |
| $NaGdO_2$ | 4.13 | −0.102 | $Na_2O$—$Gd_2O_3$ | $I4_1/amd$ | $LiFeO_2$-alpha |
| $NaAlO_2$ | 4.13 | −0.117 | $Na_7Al_3O_8$—$Al_2O_3$ | $Pna2_1$ | $NaFeO_2$ |
| $Na_6Be_8O_{11}$ | 3.95 | −0.002 | $Na_2BeO_2$—BeO | $P\bar{1}$ | None |
| $NaNdO_2$ | 3.72 | −0.089 | $Na_2O$—$Nd_2O_3$ | $I4_1/amd$ | $LiFeO_2$-alpha |
| $NaScO_2$ | 3.70 | −0.093 | $Na_2O$—$Sc_2O_3$ | $I4_1/amd$ | None |
| $Na_4WO_5$ | 3.67 | −0.100 | $Na_2O$—$Na_2WO_4$ | $P\bar{1}$ | $Li_4TeO_5$ |
| $Na_4SiO_4$ | 3.60 | −0.091 | $Na_2SiO_3$—$Na_8SiO_6$ | $P\bar{1}$ | None |
| $NaPrO_2$ | 3.60 | −0.082 | $Na_2O$—$Pr_2O_3$ | $I4_1/amd$ | $LiFeO_2$-alpha |
| $Na_4TiO_4$ | 3.59 | −0.112 | $Na_2O$—$Na_2TiO_3$ | $P\bar{1}$ | $Na_4SiO_4$ |
| $Na_3BO_3$ | 3.33 | −0.072 | $Na_2O$—$Na_4B_2O_5$ | $P2_1/c$ | None |
| $Na_2BeO_2$ | 3.11 | −0.045 | $Na_2O$—$Na_6Be_8O_{11}$ | $P2_1$ | None |
| $Na_7Al_3O_8$ | 2.98 | −0.007 | $NaAlO_2$—$Na_{17}Al_5O_{16}$ | $P\bar{1}$ | None |
| $Na_5TaO_5$ | 2.87 | −0.148 | $Na_2O$—$NaTaO_3$ | C2/c | $Na_5NbO_5$ |
| $Na_5NbO_5$ | 2.81 | −0.158 | $Na_2O$—$NaNbO_3$ | C2/c | $Na_5NbO_5$ |
| $Na_5AlO_4$ | 2.66 | −0.005 | $Na_2O$—$Na_{17}Al_5O_{16}$ | Pmmn | None |
| $Na_{17}Al_5O_{16}$ | 2.56 | −0.007 | $Na_5AlO_4$—$Na_7Al_3O_8$ | Cm | None |
| $Na_4I_2O$ | 2.44 | −0.030 | $Na_2O$—NaI | I4/mmm | $K_2MgF_4$ |
| $Na_5GaO_4$ | 2.40 | −0.040 | $Na_2O$—$Na_{39}Ga_8O_{32}$—$NaGa_4$ | Pbca | None |
| $Na_3ClO$ | 2.25 | −0.003 | NaCl | $Pm\bar{3}m$ | $CaTiO_3$ |
| $Na_2Hf_2O_5$ | 2.17 | −0.011 | $Na_2O$—$HfO_2$ | P4/mmm | defect_perovskite |
| $Na_4Br_2O$ | 2.14 | −0.019 | NaBr | I4/mmm | $K_2MgF_4$ |
| $NaNbO_2$ | 1.53 | −0.137 | $NaNbO_3$—Nb—$Na_5NbO_5$ | $P6_3/mmc$ | None |

TABLE 13

Chloride coatings for sodium metal anodes.

| | Band Gap | Stability | Competing Phases | Space Group | Prototype |
|---|---|---|---|---|---|
| Binary Compounds | | | | | |
| $YbCl_2$ | 5.63 | −0.250 | $Yb_6Cl_{13}$—Yb | $P4_2/mnm$ | C4 |
| $EuCl_2$ | 5.19 | −0.837 | $EuCl$—$EuCl_3$ | Pnma | $PbCl_2$ |
| NaCl | 5.18 | −0.727 | $NaCl_2$—$Na_3Cl$ | $Fm\bar{3}m$ | B1 |
| CsCl | 5.08 | −0.629 | $Cs_3Cl_2$—$CsCl_2$ | $Fm\bar{3}m$ | B1 |
| RbCl | 4.98 | −0.715 | $Rb_3Cl_2$—$Cl_2$ | $R\bar{3}m$ | $L1_1$ |
| Ternary Sodium-Containing Compounds | | | | | |
| $Na_3ClO$ | 2.25 | −0.003 | NaCl | $Pm\bar{3}m$ | $CaTiO_3$ |

TABLE 14

Nitride binary and ternary coatings for Na metal anodes.

| | Band Gap | Stability | Competing Phases | Space Group | Prototype |
|---|---|---|---|---|---|
| Binary Compounds | | | | | |
| BN | 4.38 | −1.071 | $B_{13}N_2$—$N_2$ | $P6_3/mmc$ | BN |
| AlN | 4.34 | −1.275 | $Al_3N$—$N_2$ | $P6_3mc$ | B4 |
| $Be_3N_2$ | 3.52 | −0.710 | $Be_2N$—$N_2$ | $Ia\bar{3}$ | $Mn_2O_3$ |
| GaN | 1.99 | −0.382 | Ga—$N_2$ | $P6_3mc$ | B4 |
| $Mg_3N_2$ | 1.78 | −0.351 | $Mg_2N$—$N_2$ | $Ia\bar{3}$ | $Mn_2O_3$ |
| LaN | 1.29 | −0.647 | $La_2N$—$N_2$ | $P6_3mc$ | B4 |
| $Ca_3N_2$ | 1.26 | −0.091 | $Ca_2N$—$N_2$ | $Ia\bar{3}$ | $Mn_2O_3$ |
| $Li_3N$ | 1.22 | −0.319 | Li—$N_2$ | P6/mmm | $Li_3N$ |
| $Hf_3N_4$ | 1.17 | −0.071 | HfN—$N_2$ | $I\bar{4}_3d$ | $Th_3P_4$ |
| $Zr_3N_4$ | 1.04 | −0.009 | ZrN—$N_2$ | Pnma | None |
| Ternary Sodium-Containing Compounds | | | | | |
| $NaPN_2$ | 4.87 | −0.259 | $NaP_4N_7$—$Na_3P$—$N_2$ | $I\bar{4}_2d$ | $KCoO_2$ |
| $NaSi_2N_3$ | 4.48 | −0.186 | Na—$Si_3N_4$—$N_2$ | $Cmc2_1$ | $Na_2SiO_3$ |
| $Na_2CN_2$ | 3.35 | −0.337 | Na—NaCN—$N_2$ | C2/m | $K_2$ |
| $Na_4ReN_3$ | 2.48 | −0.255 | Na—Re—$N_2$ | Cc | $Na_4FeO_3$ |
| $NaH_2N$ | 2.13 | −0.122 | NaH—$H_3N$—$N_2$ | Fddd | $NaNH_2$ |
| $Na_3WN_3$ | 1.85 | −0.429 | Na—W—$N_2$ | Cc | $Na_3MoN_3$ |
| $Na_3BN_2$ | 1.85 | −0.114 | Na—BN—$N_2$ | $P2_1/c$ | $Na_3BN_2$ |
| $Na_3MoN_3$ | 1.58 | −0.280 | Na—MoN—$N_2$ | Cc | $Na_3MoN_3$ |
| $NaTaN_2$ | 1.51 | −0.188 | Na—$NaTa_3N_5$—$N_2$ | $R\bar{3}m$ | $NaCrS_2$ |

TABLE 15

Bromide binary and ternary coatings for Na metal anodes.

| | Band Gap | Stability | Competing Phases | Space Group | Prototype |
|---|---|---|---|---|---|
| Binary Compounds | | | | | |
| KBr | 4.45 | −0.622 | $K_3Br_2$—$KBr_2$ | $Fm\bar{3}m$ | NaCl |
| RbBr | 4.42 | −0.613 | $Rb_3Br_2$—$RbBr_2$ | $Fm\bar{3}m$ | B1 |
| CsBr | 4.41 | −0.543 | $CsBr_3$—$Cs_3Br_2$ | $Fm\bar{3}m$ | B1 |
| $EuBr_2$ | 4.40 | −0.812 | EuBr—$EuBr_3$ | P4/n | $SrBr_2$ |
| NaBr | 4.36 | −0.639 | $NaBr_3$—$Na_3Br_2$ | $Fm\bar{3}m$ | B1 |
| Ternary Sodium-Containing Compounds | | | | | |
| $Na_4Br_2O$ | 2.14 | −0.019 | NaBr | I4/mmm | $K_2MgF_4$ |

TABLE 16

Sulfide binary and ternary coatings for Na metal anodes.

| | Band Gap | Stability | Competing Phases | Space Group | Prototype |
|---|---|---|---|---|---|
| Binary Compounds | | | | | |
| $Li_2S$ | 3.66 | −0.561 | $Li_3S$—LiS | $Fm\bar{3}m$ | None |
| $Na_2S$ | 2.63 | −0.377 | $Na_3S$—NaS | $Fm\bar{3}m$ | $CaF_2$ |
| SrS | 2.57 | −0.666 | $SrS_2$—$Sr_3S_2$ | $Fm\bar{3}m$ | B1 |
| CaS | 2.50 | −0.988 | $Ca_2S$—$Ca_2S_3$ | $Fm\bar{3}m$ | B1 |
| YbS | 2.33 | −0.431 | $Yb_3S_2$—$Yb_7S_8$ | $Fm\bar{3}m$ | None |
| BaS | 2.24 | −0.594 | $Ba_2S$—$Ba_2S_3$ | $Fm\bar{3}m$ | B1 |

TABLE 16-continued

Sulfide binary and ternary coatings for Na metal anodes.

| | Band Gap | Stability | Competing Phases | Space Group | Prototype |
|---|---|---|---|---|---|
| EuS | 2.07 | −0.701 | $Eu_2S$—$Eu_3S_4$ | $Fm\bar{3}m$ | NaCl |
| Ternary Sodium-Containing Compounds | | | | | |
| NaLiS | 3.40 | −0.005 | $Li_2S$ | P4/nmm | $Cu_2Sb$ |
| $NaLuS_2$ | 2.55 | −0.153 | $Na_2S$—$Lu_2S_3$ | $R\bar{3}m$ | $NaCrS_2$ |
| $NaErS_2$ | 2.47 | −0.159 | $Na_2S$—$Er_2S_3$ | $R\bar{3}m$ | $NaCrS_2$ |
| $NaHoS_2$ | 2.42 | −0.154 | $Na_2S$—$Ho_2S_3$ | $R\bar{3}m$ | $NaCrS_2$ |
| $NaYS_2$ | 2.40 | −0.152 | $Na_2S$—$Y_2S_3$ | $R\bar{3}m$ | $NaCrS_2$ |
| $NaTmS_2$ | 2.39 | −0.153 | $Na_2S$—$Tm_2S_3$ | $R\bar{3}m$ | $NaCrS_2$ |

TABLE 17

Carbide binary and ternary coatings for Na metal anodes.

| | Band Gap | Stability | Competing Phases | Space Group | Prototype |
|---|---|---|---|---|---|
| Binary Compounds | | | | | |
| SiC | 2.15 | −0.209 | C—Si | $P6_3mc$ | SiC |
| $Al_4C_3$ | 1.47 | −0.098 | C—Al | R3m | None |
| $Be_2C$ | 1.41 | −0.234 | Be—C | $Fm\bar{3}m$ | $CaF_2$ |
| Ternary Sodium-Containing Compounds | | | | | |
| $Na_2CN_2$ | 3.35 | −0.337 | Na—NaCN—$N_2$ | C2/m | $K_2$ |

TABLE 18

Quaternary coatings for sodium metal anodes.

| | Band Gap | Stability | Competing Phases | Space Group | Prototype |
|---|---|---|---|---|---|
| Oxide Compounds | | | | | |
| $NaLi_2PO_4$ | 5.65 | −0.054 | $Na_2O$—$Na_4P_2O_7$—$Li_3PO_4$ | Pnma | $Li_3PO_4$ |
| $NaLi_3SiO_4$ | 5.28 | −0.007 | $Na_4SiO_4$—$Li_4SiO_4$ | $I4_1/a$ | None |
| $Na_3Ca_2TaO_6$ | 4.39 | −0.073 | $NaTaO_3$—CaO—$Na_5TaO_5$ | Fddd | None |
| $Na_2MgSiO_4$ | 4.15 | −0.018 | MgO—$Na_2SiO_3$ | $Pna2_1$ | $Na_2ZnSiO_4$ |
| $NaLa_2TaO_6$ | 4.12 | −0.017 | $La_3TaO_7$—$Na_5TaO_5$—$NaTaO_3$ | $P2_1/c$ | $Na_3AlF_6$ |
| $NaSr_3TaO_6$ | 4.11 | −0.056 | $Na_5TaO_5$—$Sr_2Ta_2O_7$—SrO | $R\bar{3}c$ | $K_4CdCl_6$ |
| $NaSrBO_3$ | 4.10 | −0.020 | $Na_3BO_3$—$Sr_3B_2O_6$ | $P2_1/c$ | None |
| $BaNaBO_3$ | 4.00 | −0.171 | $NaBO_2$—BaO | C2/m | $Na_2CO_3$ |
| $Ba_3NaTaO_6$ | 3.63 | −0.061 | $Na_5TaO_5$—$Ba_4Ta_2O_9$—BaO | $R\bar{3}c$ | $K_4CdCl_6$ |
| $Na_5WNO_4$ | 3.31 | −0.012 | $Na_2O$—$Na_4WN_2O_2$—$Na_4WO_5$ | $Cmc2_1$ | None |
| $Ba_3NaNbO_6$ | 3.26 | −0.067 | $Na_5NbO_5$—BaO—$Ba_3Nb_2O_8$ | $R\bar{3}c$ | $K_4CdCl_6$ |
| $Na_4MoN_2O_2$ | 2.58 | −0.040 | $Na_3MoN_3$—$Na_5MoNO_4$ | $P\bar{1}$ | $Na_4WO_2N_2$ |
| $Na_4WN_2O_2$ | 2.21 | −0.025 | $Na_3WN_3$—$Na_5WNO_4$ | $P\bar{1}$ | $Na_4WO_2N_2$ |
| Nitride Compounds | | | | | |
| $Na_5WNO_4$ | 3.31 | −0.012 | $Na_2O$—$Na_4WN_2O_2$—$Na_4WO_5$ | $Cmc2_1$ | None |
| $NaLi_3H_8N_4$ | 2.97 | −0.007 | $NaH_2N$—$LiH_2N$ | $I\bar{4}$ | $LiNH_2$ |
| $Na_4MoN_2O_2$ | 2.58 | −0.040 | $Na_3MoN_3$—$Na_5MoNO_4$ | $P\bar{3}$ | $Na_4WO_2N_2$ |
| $NaSr_4B_3N_6$ | 2.22 | −0.256 | BN—$Sr_2N$—$Na_3BN_2$—SrN | $Im\bar{3}m$ | $Sr_9B_6N_{12}$ |
| $Na_4WN_2O_2$ | 2.21 | −0.025 | $Na_3WN_3$—$Na_5WNO_4$ | $P\bar{1}$ | $Na_4WO_2N_2$ |
| $Ba_4NaB_3N_6$ | 2.18 | −0.027 | $Ba_3B_2N_4$—$Na_3BN_2$ | $Im\bar{3}m$ | $Sr_9B_6N_{12}$ |

For Na metal anodes, Tables 11-17 list the binary and ternary compounds that passed the screens containing F, O, Cl, N, Br, S, and C anions respectively. Table 18 lists all quaternary compounds for lithium metal anodes, which contained only O and N anions. Na solid electrolytes for room temperature batteries have been studied less than Li solid electrolytes due to the relatively modest performance of Na solid electrolytes and electrodes. The most famous Na solid electrolyte is Na-beta alumina (Na-β"-$Al_2O_3$), which has a composition given by $(Na_2O)_{1+x}(Al_2O_3)_{11}$, where x ranges from 0 to 0.57. Na-beta alumina is not in the OQMD dataset. The compound that is nearest in composition to Na-beta alumina in the OQMD is $Al_2O_3$, which did not pass the screens. However, four ternary Na—Al—O compounds were identified that passed the screens, including $NaAlO_2$, $Na_7Al_3O_8$, $Na_5AlO_4$, and $Na_{17}Al_{15}O_{16}$. This finding of Na—Al—O coatings for Na anodes differed from the finding for Li anodes, where no ternary Li—Al—O compounds passed the screens.

The set of oxide coatings for Na metal anodes included 63 compounds comprising 24 binaries, 26 ternaries, and 13 quaternaries, making it the largest set among the anode/anion pairs that were considered. Fourteen compounds were identified with the formula $R_2O_3$, where R is a rare earth including Y, Lu, Dy, Tm, Ho, Sc, Er, Tb, Gd, Nd, Sm, Pr, Ce, and La. Seven ternary oxides were also identified with the formula $NaRO_2$, where R is a rare earth including Y, Er, Tb, Gd, Nd, Sc, and Pr. Six ternary sulfides were identified for Na anodes, including five compounds with the formula $NaRS_2$, where R is a rare earth including Lu, Er, Ho, Y, and Tm. Whereas, for Li anodes, no ternary sulfides were identified.

Tables 19-25 list binary and ternary coatings for Mg anodes containing F, O, Cl, N, Br, S, and C anions, respectively. No quaternary coatings were identified for Mg anodes. Electronic bandgaps and stabilities are reported in eV. Stabilities are calculated with respect to the nearest-energy set of competing phases. Space group and prototype structure are also listed.

TABLE 19

Fluoride binary and ternary coatings for Mg metal anodes.

| | Band Gap | Stability | Competing Phases | Space Group | Prototype |
|---|---|---|---|---|---|
| Binary Compounds | | | | | |
| LiF | 9.56 | −1.050 | $LiF_2$—$Li_3F_2$ | $Fm\bar{3}m$ | $B_1$ |
| $SmF_3$ | 8.38 | −1.680 | $SmF_2$—$F_2$ | Pnma | $YF_3$ |
| $HoF_3$ | 8.32 | −1.713 | $HoF_2$—$F_2$ | Pnma | $YF_3$ |
| $ErF_3$ | 8.31 | −2.450 | $Er_2F_3$—$F_2$ | Pnma | $YF_3$ |
| $EuF_2$ | 7.94 | −0.925 | $Eu_2F_3$—$EuF_3$ | $Fm\bar{3}m$ | $CaF_2$ |
| $MgF_2$ | 7.64 | −1.487 | $MgF_3$—$MgF$ | $P4_2/mnm$ | $TiO_2$ |
| $SrF_2$ | 7.43 | −1.232 | $SrF_3$—$SrF$ | $Fm\bar{3}m$ | $CaF_2$ |
| $CaF_2$ | 7.41 | −0.965 | $Ca_2F_3$—$CaF_3$ | $R\bar{3}m$ | None |
| $YbF_2$ | 7.31 | −1.287 | $YbF_3$—$YbF$ | $P4_2/mnm$ | C4 |
| $BaF_2$ | 7.05 | −0.846 | $BaF_3$—$Ba_2F_3$ | $Fm\bar{3}m$ | None |
| NaF | 6.65 | −0.908 | $Na_3F_2$—$NaF_2$ | $Fm\bar{3}m$ | $B_1$ |
| Ternary Magnesium-Containing Compounds | | | | | |
| $KMgF_3$ | 7.85 | −0.038 | $K_2MgF_4$—$MgF_2$ | $Pm\bar{3}m$ | $CaTiO_3$ |
| $NaMgF_3$ | 7.51 | −0.025 | NaF—$MgF_2$ | Pnma | $GdFeO_3$ |
| $RbMgF_3$ | 7.47 | −0.020 | $Rb_2MgF_4$—$MgF_2$ | $P6_3/mmc$ | $BaFeO_2$ + x |
| $Cs_4Mg_3F_{10}$ | 7.00 | −0.041 | CsF—$MgF_2$ | Cmca | $Sr_4Mn_3O_{10}$ |
| $Mg_3NF_3$ | 4.23 | −0.011 | $Mg_2NF$—$MgF_2$ | $Pm\bar{3}m$ | $U_4S_3$ |

TABLE 20

Oxide binary and ternary coatings for Mg metal anodes.

| | Band Gap | Stability | Competing Phases | Space Group | Prototype |
|---|---|---|---|---|---|
| Binary Compounds | | | | | |
| BeO | 7.90 | −1.584 | Be—$Be_2O_3$ | $P6_3mc$ | B4 |
| MgO | 4.97 | −1.010 | $Mg_2O$—$Mg_4O_5$ | $Fm\bar{3}m$ | B1 |
| $Y_2O_3$ | 4.37 | −0.823 | $Y_4O_5$—$YO_2$ | $Ia\bar{3}$ | $Mn_2O_3$ |
| $Lu_2O_3$ | 4.22 | −1.056 | $Lu_4O_5$—$O_2$ | $Ia\bar{3}$ | $Mn_2O_3$ |
| $Dy_2O_3$ | 4.17 | −0.989 | $Dy_4O_5$—$O_2$ | $Ia\bar{3}$ | $Mn_2O_3$ |
| $Tm_2O_3$ | 4.16 | −0.859 | $TmO_2$—$Tm_4O_5$ | $I2_13$ | $Sm_2O_3$ |
| $Ho_2O_3$ | 4.14 | −1.011 | $Ho_4O_5$—$O_2$ | $Ia\bar{3}$ | $Mn_2O_3$ |
| $Sc_2O_3$ | 4.12 | −0.840 | $ScO_2$—$Sc_4O_5$ | $Ia\bar{3}$ | $Mn_2O_3$ |
| $Er_2O_3$ | 4.12 | −1.016 | $Er_4O_5$—$O_2$ | $Ia\bar{3}$ | $Mn_2O_3$ |
| $Tb_2O_3$ | 4.09 | −0.488 | TbO—$Tb_7O_{12}$ | $Ia\bar{3}$ | $Mn_2O_3$ |
| $Gd_2O_3$ | 4.08 | −0.969 | $Gd_4O_5$—$O_2$ | $Ia\bar{3}$ | $Mn_2O_3$ |
| CaO | 3.75 | −1.134 | $Ca_2O_3$—$Ca_2O$ | $Fm\bar{3}m$ | B1 |
| YbO | 3.52 | −0.950 | $Yb_4O_5$—$Yb_3O_2$ | $Fm\bar{3}m$ | B1 |
| EuO | 2.81 | −0.797 | $Eu_2O$—$Eu_3O_4$ | $Fm\bar{3}m$ | B1 |

TABLE 21

Chloride binary and ternary coatings for Mg metal anodes.

| | Band Gap | Stability | Competing Phases | Space Group | Prototype |
|---|---|---|---|---|---|
| Binary Compounds | | | | | |
| LiCl | 6.25 | −0.772 | $LiCl_2$—$Li_3Cl_2$ | $F\bar{4}3m$ | $B_3$ |
| $BaCl_2$ | 5.69 | −0.648 | $BaCl_3$—$Ba_2Cl_3$ | $Fm\bar{3}m$ | $CaF_2$ |
| $YbCl_2$ | 5.63 | −0.250 | $Yb_6Cl_{13}$—Yb | $P4_2/mnm$ | C4 |
| $MgCl_2$ | 5.62 | −0.883 | $MgCl_3$—$MgCl_3$ | $R\bar{3}m$ | $CdCl_2$ |
| $SrCl_2$ | 5.53 | −0.962 | SrCl—$SrCl_3$ | $Fm\bar{3}m$ | $CaF_2$ |
| $CaCl_2$ | 5.48 | −0.723 | $Ca_2Cl_3$—$CaCl_3$ | $P4_2/mnm$ | $TiO_2$ |
| KCl | 5.30 | −0.732 | $KCl_2$—$K_3Cl_2$ | $Fm\bar{3}m$ | B1 |
| $EuCl_2$ | 5.19 | −0.837 | EuCl—$EuCl_3$ | Pnma | $PbCl_2$ |
| NaCl | 5.18 | −0.727 | $NaCl_2$—$Na_3Cl_2$ | $Fm\bar{3}m$ | B1 |
| CsCl | 5.08 | −0.629 | $Cs_3Cl_2$—$CsCl_2$ | $Fm\bar{3}m$ | B1 |
| RbCl | 4.98 | −0.715 | $Rb_3Cl_2$—$Cl_2$ | $R\bar{3}m$ | $L1_1$ |
| $TmCl_3$ | 4.92 | −0.857 | $TmCl_2$—$Cl_2$ | $R\bar{3}c$ | $FeF_3$ |
| $YCl_3$ | 4.77 | −0.834 | $YCl_2$—$Cl_2$ | C2/m | $RhBr_3$ |
| $TbCl_3$ | 4.74 | −0.822 | $TbCl_2$—$Cl_2$ | $P4_2/mnm$ | None |
| $CeCl_3$ | 4.71 | −1.252 | $Ce_2Cl_3$—$Cl_2$ | $P2_1/m$ | $UCl_3$ |
| $PrCl_3$ | 4.46 | −0.813 | $PrCl_2$—$Cl_2$ | $P2_1/m$ | $UCl_3$ |
| $NdCl_3$ | 4.43 | −0.807 | $NdCl_2$—$Cl_2$ | $P2_1/m$ | $UCl_3$ |
| $GdCl_3$ | 4.37 | −0.799 | $GdCl_2$—$Cl_2$ | $P6_3/m$ | $UCl_3$ |
| $DyCl_3$ | 3.75 | −0.818 | $DyCl_2$—$Cl_2$ | Cmcm | $NdBr_3$ |
| $LaCl_3$ | 3.74 | −0.855 | $LaCl_2$—$Cl_2$ | $P6_3/m$ | $UCl_3$ |
| $LuCl_3$ | 3.19 | −0.791 | $LuCl_2$—$Cl_2$ | $P6_3/mmc$ | $DO_{19}$ |
| Ternary Magnesium-Containing Compounds | | | | | |
| $CsMgCl_3$ | 5.34 | −0.031 | $Cs_2MgCl_4$—$MgCl_2$ | Cmcm | $BaNiO_3$ |
| $Cs_2MgCl_4$ | 5.16 | 0.000 | $CsMgCl_3$—CsCl | Pnma | $Cs_2CuCl_4$ |
| $RbMgCl_3$ | 5.04 | −0.028 | RbCl—$MgCl_2$ | $P6_3/mmc$ | None |
| $K_2MgCl_4$ | 4.99 | −0.003 | KCl—$MgCl_2$ | I4/mmm | $K_2MgF_4$ |

TABLE 22

Nitride binary and ternary coatings for Mg metal anodes.

| | Band Gap | Stability | Competing Phases | Space Group | Prototype |
|---|---|---|---|---|---|
| Binary Compounds | | | | | |
| BN | 4.38 | −1.071 | $B_{13}N_2$—$N_2$ | $P6_3/mmc$ | BN |
| AlN | 4.34 | −1.275 | $Al_3N$—$N_2$ | $P6_3mc$ | B4 |
| $Be_3N_2$ | 3.52 | −0.710 | $Be_2N$—$N_2$ | $Ia\bar{3}$ | $Mn_2O_3$ |
| $Mg_3N_2$ | 1.78 | −0.351 | $Mg_2N$—$N_2$ | $Ia\bar{3}$ | $Mn_2O_3$ |

TABLE 22-continued

Nitride binary and ternary coatings for Mg metal anodes.

| | Band Gap | Stability | Competing Phases | Space Group | Prototype |
|---|---|---|---|---|---|
| Ternary Magnesium-Containing Compounds | | | | | |
| $MgSiN_2$ | 4.29 | −0.224 | $Mg_3N_2$—$Si_3N_4$ | $Pna2_1$ | $NaFeO_2$ |
| $Mg_3NF_3$ | 4.23 | −0.011 | $Mg_2NF$—$MgF_2$ | $Pm\bar{3}m$ | $U_4S_3$ |
| $MgBe_2N_2$ | 4.16 | −0.083 | $Mg_3N_2$—$Be_3N_2$ | $P\bar{3}m1$ | $La_2O_3$ |
| $MgB_9N$ | 1.82 | −0.064 | B—$MgB_7$—BN | $R\bar{3}m$ | None |

TABLE 23

Bromide binary and ternary coatings for Mg metal anodes.

| | Band Gap | Stability | Competing Phases | Space Group | Prototype |
|---|---|---|---|---|---|
| Binary Compounds | | | | | |
| LiBr | 5.15 | −0.673 | $LiBr_2$—$Li_3Br_2$ | $F\bar{4}_3m$ | B3 |
| $YbBr_2$ | 4.80 | −0.783 | $YbBr_3$—YbBr | Pnnm | None |
| $SrBr_2$ | 4.72 | −0.827 | $SrBr_3$—SrBr | Pnma | $PbCl_2$ |
| $CaBr_2$ | 4.68 | −0.898 | $CaBr_3$—CaBr | Pnnm | $CaCl_2$ |
| $MgBr_2$ | 4.63 | −0.770 | $MgBr$—$MgBr_3$ | $P\bar{3}m1$ | $CdI_2$/$Mg(OH)_2$ |
| $BaBr_2$ | 4.48 | −0.557 | $Ba_2Br_3$—$BaBr_3$ | Pnma | $PbCl_2$ |
| KBr | 4.45 | −0.622 | $K_3Br_2$—$KBr_2$ | $Fm\bar{3}m$ | NaCl |
| RbBr | 4.42 | −0.613 | $Rb_3Br_2$—$RbBr_2$ | $Fm\bar{3}m$ | B1 |
| CsBr | 4.41 | −0.543 | $CsBr_3$—$Cs_3Br_2$ | $Fm\bar{3}m$ | B1 |
| $EuBr_2$ | 4.40 | −0.812 | $EuBr_3$—EuBr | P4/n | $SrBr_2$ |
| NaBr | 4.36 | −0.639 | $NaBr_3$—$Na_3Br_2$ | $Fm\bar{3}m$ | B1 |
| $GdBr_3$ | 3.80 | −0.731 | $GdBr_2$—$Br_2$ | C2/m | $RhBr_3$ |
| $PrBr_3$ | 3.57 | −0.292 | $Pr_2Br_5$—$Br_2$ | $P6_3/m$ | $UCl_3$ |
| $CeBr_3$ | 3.55 | −0.299 | $Ce_2Br_5$—$Br_2$ | $P2_1/m$ | $UCl_3$ |
| $LaBr_3$ | 3.10 | −0.312 | $La_2Br_5$—$Br_2$ | $P6_3/m$ | $UCl_3$ |
| $SmBr_3$ | 2.87 | −0.687 | $SmBr_2$—$Br_2$ | Cmcm | $NdBr_3$ |
| $NdBr_3$ | 2.85 | −0.679 | $NdBr_2$—$Br_2$ | Cmcm | $NdBr_3$ |
| $ErBr_3$ | 2.27 | −0.653 | $ErBr_2$—$Br_2$ | $P6_3/mmc$ | $DO_{19}$ |
| Ternary Magnesium-Containing Compounds | | | | | |
| $CsMgBr_3$ | 4.23 | −0.041 | $MgBr_2$—CsBr | Cmcm | $BaNiO_3$ |

TABLE 24

Sulfur binary and ternary coatings for Mg metal anodes.

| | Band Gap | Stability | Competing Phases | Space Group | Prototype |
|---|---|---|---|---|---|
| Binary Compounds | | | | | |
| $Li_2S$ | 3.66 | −0.561 | $Li_3S$—LiS | $Fm\bar{3}m$ | None |
| MgS | 2.85 | −0.608 | $MgS_2$—$Mg_2S$ | $R\bar{3}m$ | $L1_1$ |
| $Na_2S$ | 2.63 | −0.377 | $Na_3S$—NaS | $Fm\bar{3}m$ | $CaF_2$ |
| SrS | 2.57 | −0.666 | $SrS_2$—$Sr_3S_2$ | $Fm\bar{3}m$ | B1 |
| CaS | 2.50 | −0.988 | $Ca_2S_3$—$Ca_2S$ | $Fm\bar{3}m$ | B1 |
| $K_2S$ | 2.44 | −0.339 | $K_3S$—KS | $Fm\bar{3}m$ | $CaF_2$ |
| YbS | 2.33 | −0.431 | $Yb_3S_2$—$Yb_7S_8$ | $Fm\bar{3}m$ | None |
| BaS | 2.24 | −0.594 | $Ba_2S$—$Ba_2S_3$ | $Fm\bar{3}m$ | B1 |
| $Cs_2S$ | 2.21 | −0.240 | $Cs_3S$—CsS | Pnma | None |
| $Rb_2S$ | 2.21 | −0.297 | RbS—$Rb_3S$ | $Fm\bar{3}m$ | $CaF_2$ |
| EuS | 2.07 | −0.701 | $Eu_3S_4$—$Eu_2S$ | $Fm\bar{3}m$ | NaCl |

TABLE 24-continued

Sulfur binary and ternary coatings for Mg metal anodes.

| | Band Gap | Stability | Competing Phases | Space Group | Prototype |
|---|---|---|---|---|---|
| Ternary Magnesium-Containing Compounds | | | | | |
| $Lu_2MgS_4$ | 2.13 | −0.011 | MgS—$Lu_2S_3$ | $Fd\bar{3}m$ | $Al_2MgO_4$ |

TABLE 25

Carbide binary and ternary coatings for Mg metal anodes.

| | Band Gap | Stability | Competing Phases | Space Group | Prototype |
|---|---|---|---|---|---|
| Binary Compounds | | | | | |
| $Al_4C_3$ | 1.47 | −0.098 | C—Al | R3m | None |
| $Be_2C$ | 1.41 | −0.234 | Be—C | $Fm\bar{3}m$ | $CaF_2$ |
| Ternary Magnesium-Containing Compounds | | | | | |
| $MgAl_2C_2$ | 1.90 | −0.002 | Mg—$Al_4C_3$—C | $P\bar{3}m1$ | $La_2O_3$ |
| $MgB_2C_2$ | 1.16 | −0.070 | Mg—C—$MgB_{12}C_2$ | Cmca | None |

For Mg metal anodes, Tables 19-25 list the binary and ternary compounds that passed the screens containing F, O, Cl, N, Br, S, and C anions respectively. No quaternary compounds passed the screens for Mg anodes. Five ternary fluoride coatings were identified for Mg anodes, whereas no ternary fluorides passed the screens for Li or Na anodes. Nine coatings were identified with the formula $R_2O_3$, where R is a rare earth including Y, Lu, Dy, Tm, Ho, Sc, Er, Tb, and Gd. Ten coatings were identified with the formula $RCl_3$, where R is a rare earth including Tm, Y, Tb, Ce, Pr, Nd, Gd, Dy, La, and Lu. One ternary sulfide was identified, $Lu_2MgS_4$.

Each compound that passed the screens shared a tie line with the anode metal within the computed convex hull.

These coatings may be employed at nanometer thickness, where ionic conductivity of the coatings does not strongly impact cell impedance. The ionic conductivity for at least some embodiments of the compounds may enable these compounds to be used not just as anode coatings, but also as thick solid electrolytes that enable transport between the anode and cathode.

CONCLUSIONS

It was found that many solid electrolyte and electrode coating materials in the literature react with Li anodes to form unanticipated phases, including phases that are electronically conductive and therefore prevent passivation of the anode/electrolyte interface. The OQMD was screened to identify coatings for Li, Na, and Mg metal anodes that exhibit chemical equilibrium with the anode metals and that are electronic insulators. Ninety-two promising coatings were identified for Li anodes, as well as 118 for Na anodes, and 97 for Mg anodes. These coatings included binary, ternary, and quaternary compounds. For Li anodes, Li-containing ternary coatings were identified, including seven oxides and 21 nitrides, but no fluorides or sulfides. For Na anodes, Na-containing ternaries were identified, including 26 oxides, nine nitrides, and six sulfides, but no fluorides. For Mg anodes, Mg-containing ternaries were identified, including five fluorides, four nitrides, and one sulfide, but no oxides. A variety of chloride, bromide, and carbide coatings were also identified.

Many of the new coatings share similar compositions and can therefore be grouped into classes. Several new classes of coatings were identified for Li anodes, including $Li_xMN_4$ (x=5, 6, 7; M=transition metal), $R_2O_3$ (R=rare earth), and $LiRO_2$. For Na anodes, classes of coatings were identified, including $R_2O_3$, $NaRO_2$, and $NaRS_2$. For Mg anodes, classes of coatings were identified, including $R_2O_3$ and $RCl_3$. Within the ninety two compounds identified for Li anodes, only $Li_3N$ and $Li_7La_3Hf_2O_{12}$ have been studied extensively as solid electrolyte materials.

Example 2: Coatings for Lithium Anodes and Solid-State Electrolytes in Lithium Batteries In this example, the Open Quantum Materials Database was used to search for coating materials that exhibit stable equilibrium with both Li metal and various solid electrolyte materials, that are electronic insulators, and that contain Li sublattices. The requirement for a Li sublattice was relaxed for the binary compounds. The pentenary compounds that passed the screens contained only small concentrations of Li, so these compounds were excluded from the search. The coatings identified include binaries, and Li-containing ternaries and quaternaries. The computational methodology was the same as that described in detail in Example 1.

Coatings that are particularly chemically stable with respect to both lithium metal anodes and various solid electrolyte materials were identified. A general trend can be observed, whereby the oxide and nitride coatings tend to exhibit stable equilibrium with $Li_7La_3Zr_2O_{12}$, $LiLaTi_2O_6$, $Li_3PO_4$, and $Li_7PN_4$ solid electrolytes, while the fluoride, chloride, bromide, and sulfide coatings are more likely than oxides or nitrides to exhibit stable equilibrium with $LiTi_2P_3O_{12}$, $Li_3PS_4$, $Li_{10}GeP_2S_{12}$, and $Li_6PS_5Br$ solid electrolytes. For example, $CaF_2$ and $YbF_2$ are coating materials that are particularly well-suited for coating on lithium metal anodes and also stable on $Li_3PS_4$ electrolyte materials. And, as another illustration, $Li_6WN_4$ and $Li_2CN_2$ are coating materials that are particularly well-suited for coating on lithium metal and also on $Li_7La_3Zr_2O_{12}$ electrolyte materials. The full set of coatings that are particularly stable on lithium metal anodes and also on various electrolyte materials is presented in Tables 26-32.

Tables 26-32. Coatings that exhibit stable equilibrium with both Li metal and various solid electrolyte materials, including $Li_7La_3Zr_2O_{12}$, $LiLaTi_2O_6$, $Li_3PO_4$, $LiTi_2P_3O_{12}$, $Li_3PS_4$, $Li_{10}GeP_2S_{12}$, $Li_6PS_5Br$, and $Li_7PN_4$ electrolytes. All coatings that are listed exhibit stable equilibrium with Li metal. The existence of stable equilibrium between a coating and an electrolyte material is indicated with an 'X'.

TABLE 26

Fluoride Coatings

| | $Li_7La_3Zr_2O_{12}$ | $LiLaTi_2O_6$ | $Li_3PO_4$ | $LiTi_2P_3O_{12}$ | $Li_3PS_4$ | $Li_{10}GeP_2S_{12}$ | $Li_6PS_5Br$ | $Li_7PN_4$ |
|---|---|---|---|---|---|---|---|---|
| Binaries | | | | | | | | |
| LiF | X | X | X | X | X | X | X | X |
| $EuF_2$ | X | X | X | X | X | X | X | X |
| $SrF_2$ | X | | X | X | X | | | X |
| $CaF_2$ | | | X | X | X | | | |
| $YbF_2$ | | X | X | X | X | X | X | X |

TABLE 27

Oxide Coatings

| | $Li_7La_3Zr_2O_{12}$ | $LiLaTi_2O_6$ | $Li_3PO_4$ | $LiTi_2P_3O_{12}$ | $Li_3PS_4$ | $Li_{10}GeP_2S_{12}$ | $Li_6PS_5Br$ | $Li_7PN_4$ |
|---|---|---|---|---|---|---|---|---|
| Binaries | | | | | | | | |
| BeO | X | X | X | X | X | X | X | X |
| $Li_2O$ | X | X | X | | | | | X |
| $Y_2O_3$ | X | X | X | | | | | |
| $Lu_2O_3$ | X | X | X | | | | | |
| $Dy_2O_3$ | | X | X | | | | | |
| $Tm_2O_3$ | X | X | X | | | | | |
| $Ho_2O_3$ | X | X | X | | | | | |
| $Er_2O_3$ | | X | X | | | | | |
| $Gd_2O_3$ | X | X | X | | | | | |
| $Nd_2O_3$ | X | X | X | | | | | X |
| $Sm_2O_3$ | X | X | X | | | | | X |
| $Pr_2O_3$ | X | X | X | | | | | X |
| $La_2O_3$ | X | X | X | | | | | X |
| CaO | X | X | X | | | | | X |
| YbO | X | X | X | X | | | | X |
| EuO | X | X | X | | | | | X |
| Ternaries | | | | | | | | |
| $LiGdO_2$ | X | X | X | | | | | X |
| $Li_2HfO_3$ | | X | X | | | | | X |
| $LiDyO_2$ | X | X | X | | | | | X |

TABLE 27-continued

| | Oxide Coatings | | | | | | | |
|---|---|---|---|---|---|---|---|---|
| | $Li_7La_3Zr_2O_{12}$ | $LiLaTi_2O_6$ | $Li_3PO_4$ | $LiTi_2P_3O_{12}$ | $Li_3PS_4$ | $Li_{10}GeP_2S_{12}$ | $Li_6PS_5Br$ | $Li_7PN_4$ |
| $LiTbO_2$ | X | X | X | | | | | X |
| $LiHoO_2$ | X | X | X | | | | | |
| $LiErO_2$ | X | X | X | | | | | X |
| $LiScO_2$ | X | X | X | | | | | |
| Quaternaries | | | | | | | | |
| $Li_7La_3Hf_2O_{12}$ | X | X | X | | | | | X |
| $Li_{16}Nb_2N_8O$ | X | X | | | | | | X |
| $Li_{16}Ta_2N_8O$ | | X | | | | | | X |
| $LiSmEu_2O_4$ | X | X | X | | | | | X |

TABLE 28

| | Chloride Coatings | | | | | | | |
|---|---|---|---|---|---|---|---|---|
| | $Li_7La_3Zr_2O_{12}$ | $LiLaTi_2O_6$ | $Li_3PO_4$ | $LiTi_2P_3O_{12}$ | $Li_3PS_4$ | $Li_{10}GeP_2S_{12}$ | $Li_6PS_5Br$ | $Li_7PN_4$ |
| Binaries | | | | | | | | |
| LiCl | X | X | X | X | X | X | X | X |
| $BaCl_2$ | X | X | X | X | | | | X |
| $YbCl_2$ | | X | X | X | X | | | X |
| $SrCl_2$ | | X | X | X | | | | X |
| KCl | X | X | X | | X | X | | X |
| $EuCl_2$ | | X | X | X | | | | X |
| NaCl | X | X | X | | X | X | | X |
| CsCl | X | X | X | X | X | X | | X |
| RbCl | X | X | X | X | X | X | | X |
| Ternaries | | | | | | | | |
| $Li_4NCl$ | | | | | | | X | |

TABLE 29

| | Nitride Coatings | | | | | | | |
|---|---|---|---|---|---|---|---|---|
| | $Li_7La_3Zr_2O_{12}$ | $LiLaTi_2O_6$ | $Li_3PO_4$ | $LiTi_2P_3O_{12}$ | $Li_3PS_4$ | $Li_{10}GeP_2S_{12}$ | $Li_6PS_5Br$ | $Li_7PN_4$ |
| Binaries | | | | | | | | |
| AlN | | X | | | | | | X |
| $Be_3N_2$ | | X | | | | | | X |
| LaN | | | | | | | | X |
| $Li_3N$ | | | | | | | | X |
| Ternaries | | | | | | | | |
| $Li_2CN_2$ | X | X | X | | | | | X |
| $Li_2SiN_2$ | | X | | | | | | X |
| $Li_3BN_2$ | | X | | | | | | X |
| $Li_7TaN_4$ | | | | | | | | X |
| $Li_7NbN_4$ | | X | | | | | | X |
| $Li_6WN_4$ | X | X | X | | | | | X |
| $Li_7VN_4$ | X | X | | | | | | X |
| LiBeN | | X | | | | | | X |
| $Li_5ReN_4$ | X | X | X | | | | | X |
| $Li_6MoN_4$ | X | X | X | | | | | X |
| $Li_8TeN_2$ | | | | | | | | X |
| LiMgN | | | | | | | | X |
| $Li_5Br_2N$ | | | | | | | | X |
| $Li_3ScN_2$ | | | | | | | | X |
| $Li_4NCl$ | | | | | | | | X |
| $Li_4HN$ | | | | | | | | X |
| $Li_8SeN_2$ | | | | | | | | X |
| $Li_2ZrN_2$ | X | X | | | | | | X |
| LiCaN | | | | | | | | X |
| $Li_{10}BrN_3$ | | | | | | | | X |
| $SrLi_4N_2$ | | | | | | | | X |

TABLE 29-continued

Nitride Coatings

| | Li$_7$La$_3$Zr$_2$O$_{12}$ | LiLaTi$_2$O$_6$ | Li$_3$PO$_4$ | LiTi$_2$P$_3$O$_{12}$ | Li$_3$PS$_4$ | Li$_{10}$GeP$_2$S$_{12}$ | Li$_6$PS$_5$Br | Li$_7$PN$_4$ |
|---|---|---|---|---|---|---|---|---|
| Quaternaries | | | | | | | | |
| Li$_{16}$Nb$_2$N$_8$O | X | X | | | | | | X |
| Li$_{16}$Ta$_2$N$_8$O | | X | | | | | | X |
| Li$_5$La$_5$Si$_4$N$_{12}$ | | | | | | | | X |
| Li$_4$Ca$_3$Si$_2$N$_6$ | | | | | | | | X |
| Sr$_4$LiB$_3$N$_6$ | | X | | | | | | X |
| Li$_5$Ce$_5$Si$_4$N$_{12}$ | | X | | | | | | X |
| LiEu$_4$B$_3$N$_6$ | | | | | | | | X |
| LiCa$_4$B$_3$N$_6$ | | | | | | | | X |
| Sr$_3$Li$_4$Si$_2$N$_6$ | | | | | | | | X |
| SrLi$_2$CrN$_3$ | X | X | X | | | | | X |

TABLE 30

Bromide Coatings

| | Li$_7$La$_3$Zr$_2$O$_{12}$ | LiLaTi$_2$O$_6$ | Li$_3$PO$_4$ | LiTi$_2$P$_3$O$_{12}$ | Li$_3$PS$_4$ | Li$_{10}$GeP$_2$S$_{12}$ | Li$_6$PS$_5$Br | Li$_7$PN$_4$ |
|---|---|---|---|---|---|---|---|---|
| Binaries | | | | | | | | |
| LiBr | X | X | X | X | X | X | X | X |
| YbBr$_2$ | | X | X | X | X | | | X |
| SrBr$_2$ | | X | X | X | | X | | X |
| BaBr$_2$ | X | X | X | X | | | | X |
| KBr | X | X | X | X | X | X | X | X |
| RbBr | X | X | X | X | X | X | X | X |
| CsBr | X | X | X | X | X | X | X | X |
| EuBr$_2$ | | X | X | X | | | | X |
| NaBr | X | X | X | | X | X | X | X |
| Ternaries | | | | | | | | |
| Li$_5$Br$_2$N | | | | | | | | X |
| Li$_{10}$BrN$_3$ | | | | | | | | X |

TABLE 31

Sulfide Coatings

| | Li$_7$La$_3$Zr$_2$O$_{12}$ | LiLaTi$_2$O$_6$ | Li$_3$PO$_4$ | LiTi$_2$P$_3$O$_{12}$ | Li$_3$PS$_4$ | Li$_{10}$GeP$_2$S$_{12}$ | Li$_6$PS$_5$Br | Li$_7$PN$_4$ |
|---|---|---|---|---|---|---|---|---|
| Binaries | | | | | | | | |
| Li$_2$S | | X | X | | X | X | X | X |
| SrS | X | X | X | | X | X | X | X |
| CaS | | X | X | | X | X | X | X |
| YbS | | X | X | X | X | X | X | X |
| BaS | X | X | X | | | | | X |
| EuS | | X | X | X | | | | X |

TABLE 32

Carbide Coatings

| | Li$_7$La$_3$Zr$_2$O$_{12}$ | LiLaTi$_2$O$_6$ | Li$_3$PO$_4$ | LiTi$_2$P$_3$O$_{12}$ | Li$_3$PS$_4$ | Li$_{10}$GeP$_2$S$_{12}$ | Li$_6$PS$_5$Br | Li$_7$PN$_4$ |
|---|---|---|---|---|---|---|---|---|
| Binaries | | | | | | | | |
| Be$_2$C | | | | | | | | |
| Ternaries | | | | | | | | |
| Li$_2$CN$_2$ | X | X | X | | | | | X |
| LiBC | X | | | | | | | |

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A coated anode comprising:
    an anode comprising lithium metal or an alloy of lithium with one or more additional metal elements; and
    a coating on at least a portion of the anode, wherein the coating comprises a metal sulfide selected from SrS, CaS, YbS, and combinations thereof.

2. A lithium battery comprising:
    a coated anode comprising:
        an anode comprising lithium metal or an alloy of lithium with one or more additional metal elements; and
        a coating on at least a portion of the anode, wherein the coating comprises a metal sulfide selected from SrS, CaS, YbS, and combinations thereof;
    a cathode in electrical communication with the metal anode; and
    an electrolyte disposed between the coated anode and the cathode.

3. The battery of claim 2, wherein the electrolyte is a sulfide solid electrolyte.

4. The coated anode of claim 1, wherein the coating comprises SrS.

5. The coated anode of claim 1, wherein the coating comprises CaS.

6. The coated anode of claim 1, wherein the coating comprises YbS.

7. The coated anode of claim 1, wherein the coating is a single phase of the metal sulfide.

8. The coated anode of claim 1, wherein the coating comprises a mixture of metal sulfide phases.

9. The coated anode of claim 1, wherein the coating has a thickness in the range from 0.1 nm to 1000 nm.

10. The coated anode of claim 1, wherein the anode is a lithium metal anode.

11. The battery of claim 2, wherein the coating comprises SrS.

12. The battery of claim 2, wherein the coating comprises CaS.

13. The battery of claim 2, wherein the coating comprises YbS.

14. The battery of claim 2, wherein the coating is a single phase of the metal sulfide.

15. The battery of claim 2, wherein the coating comprises a mixture of metal sulfide phases.

16. The battery of claim 2, wherein the coating has a thickness in the range from 0.1 nm to 1000 nm.

17. The battery of claim 2, wherein the anode is a lithium metal anode.

* * * * *